(12) United States Patent
Milstein et al.

(10) Patent No.: US 12,073,953 B2
(45) Date of Patent: *Aug. 27, 2024

(54) MATERIAL CONFIGURATION ENABLING FLEXIBILITY OF A STRUCTURE USING RIGID COMPONENTS

(71) Applicant: STEMRAD LTD., Tel Aviv (IL)

(72) Inventors: Oren Milstein, Tel Aviv (IL); Gideon Waterman, Tel Aviv (IL); Meytal Baron, Tel Aviv (IL); Tamar Nix, Haifa (IL); Payal Jain, Toronto (CA)

(73) Assignee: STEMRAD LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,392

(22) Filed: Sep. 25, 2023

(65) Prior Publication Data

US 2024/0013942 A1 Jan. 11, 2024

Related U.S. Application Data

(60) Continuation of application No. 17/686,524, filed on Mar. 4, 2022, now Pat. No. 11,769,601, which is a
(Continued)

(51) Int. Cl.
*G21F 3/02* (2006.01)
*A41D 31/32* (2019.01)
(Continued)

(52) U.S. Cl.
CPC .......... *G21F 3/025* (2013.01); *A41D 31/325* (2019.02); *B64G 6/00* (2013.01); *G21F 1/023* (2013.01);
(Continued)

(58) Field of Classification Search
CPC . G21F 3/025; G21F 1/023; G21F 1/08; G21F 1/10; G21F 1/12; G21F 3/02; A41D 31/325; B64G 6/00
(Continued)

(56) References Cited

U.S. PATENT DOCUMENTS 3,233,248 A 2/1966 Bushnell
3,310,053 A 3/1967 Greenwood
(Continued)

FOREIGN PATENT DOCUMENTS

CN 2678066 Y 2/2005
DE 1918244 U 6/1965
(Continued)

OTHER PUBLICATIONS

Communication (Chinese First Office Action) issued by the State Intellectual Property Office of the People's Republic of China in Chinese Patent Application No. 201280034481.7, dated May 5, 2015, 16 pages total.
(Continued)

*Primary Examiner* — Nicole M Ippolito
(74) *Attorney, Agent, or Firm* — TROUTMAN PEPPER HAMILTON SANDERS LLP

(57) ABSTRACT

A light-weight radiation protection panel comprising radiation protection layer and a flexible material. The radiation protection layer comprises a plurality of a shielding material distributed in repeated and adjacent units of geometrical shapes, the light-weight radiation protection panel being able to be embodied in a wearable garment providing flexibility.

12 Claims, 16 Drawing Sheets

Related U.S. Application Data division of application No. 16/053,101, filed on Aug. 2, 2018, now Pat. No. 11,276,505.

(60) Provisional application No. 62/540,127, filed on Aug. 2, 2017.

(51) Int. Cl.
*B64G 6/00* (2006.01)
*G21F 1/02* (2006.01)
*G21F 1/08* (2006.01)
*G21F 1/10* (2006.01)
*G21F 1/12* (2006.01)
*G21F 3/025* (2006.01)

(52) U.S. Cl.
CPC ............ *G21F 1/08* (2013.01); *G21F 1/10* (2013.01); *G21F 1/12* (2013.01); *G21F 3/02* (2013.01)

(58) Field of Classification Search
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | |
|---|---|---|---|
| 3,463,150 | A | 8/1969 | Penfold |
| 3,465,153 | A | 9/1969 | Libby |
| 3,996,620 | A | 12/1976 | Maine |
| 4,196,355 | A | 4/1980 | Maine |
| 4,386,277 | A | 5/1983 | Forshee |
| 5,028,796 | A | 7/1991 | Swartz |
| 5,103,504 | A | 4/1992 | Dordevic |
| 5,621,188 | A | 4/1997 | Lee et al. |
| 5,745,925 | A | 5/1998 | Ghilardi et al. |
| 6,101,711 | A | 8/2000 | Kobayashi |
| 6,531,086 | B1 | 3/2003 | Larsson |
| 6,841,791 | B2 | 1/2005 | DeMeo et al. |
| 8,586,090 | B2 | 11/2013 | Dadachova et al. |
| 9,891,350 | B2 | 2/2018 | Lofftus et al. |
| 11,769,601 | B2 * | 9/2023 | Milstein .............. G21F 3/02 250/516.1 |
| 2003/0025089 | A1 | 2/2003 | Featherby et al. |
| 2005/0211930 | A1 | 9/2005 | DeMeo et al. |
| 2007/0237829 | A1 | 10/2007 | Dadachova et al. |
| 2008/0272318 | A1 | 11/2008 | Cadwalader et al. |
| 2009/0000007 | A1 | 1/2009 | DeMeo |
| 2009/0156982 | A1 | 6/2009 | Petrie et al. |
| 2013/0112924 | A1 | 5/2013 | Eckhoff et al. |
| 2013/0240763 | A1 | 9/2013 | Khandkar et al. |
| 2013/0309454 | A1 | 11/2013 | Propst |
| 2014/0021377 | A1 | 1/2014 | Ashok et al. |

FOREIGN PATENT DOCUMENTS

| | | | |
|---|---|---|---|
| DE | 1918244 | A1 | 11/1970 |
| DE | 4132925 | A1 | 4/1993 |
| EA | 003918 | B1 | 10/2003 |
| EP | 0173757 | A1 | 3/1986 |
| EP | 1052652 | A2 | 11/2000 |
| GB | 1020010095618 | A | 11/2011 |
| JP | 2002091599 | A | 3/1990 |
| JP | H02501769 | A | 6/1990 |
| JP | H02124600 | U | 10/1990 |
| JP | 2001242288 | A | 9/2001 |
| JP | 2002131475 | A | 5/2002 |
| JP | 2002267793 | A | 9/2002 |
| JP | 2005538356 | A | 12/2005 |
| JP | 2010133772 | A | 6/2010 |
| JP | 201376693 | A | 4/2013 |
| JP | 5532463 | B2 | 5/2014 |
| WO | 2012154962 | A2 | 11/2012 |
| WO | 2014163574 | A1 | 10/2014 |
| WO | 2016147193 | A1 | 9/2016 |

OTHER PUBLICATIONS

Communication (Chinese Second Office Action) issued by the State Intellectual Property Office of the People's Republic of China in Chinese Patent Application No. 201280034481.7, dated Mar. 11, 2016, 8 pages total.
Communication (Chinese Third Office Action) issued by the State Intellectual Property Office of the People's Republic of China in Chinese Patent Application No. 201280034481.7, dated Oct. 8, 2016, 8 pages total.
Communication (Chinese Fourth Office Action) issued by the State Intellectual Property Office of the People's Republic of China in Chinese Patent Application No. 201280034481.7, dated Apr. 6, 2017, 8 pages total.
Communication issued by Canada Patent Application by the Canadian Intellectual Property Office in Canadian Patent Application No. 2,835,601, dated May 14, 2018, 5 page.
Communication (pursuant to Article 94(3) EPC) issued by the European Patent Office in European Patent Application No. 12782620.4, dated Nov. 17, 2015, 7 pages total.
Communication (Extended European Search Report) issued by the European Patent Office in European Patent Application No. 12782620.4, dated Sep. 12, 2014, 8 pages total.
International Preliminary Report of Patentability of the International Searching Authority for International Application No. PCT/US2012/037335, dated Nov. 12, 2013, 7 pages total.
International Preliminary Report on Patentability for PCT Application No. PCT/IL2016/050298 dated Sep. 19, 2017, 9 pages total.
International Search Report for PCT Application No. PCT/IL2016/050298 dated Jul. 11, 2016, 5 pages total.
International Search Report of Application No. PCT/US2012/037335, dated Nov. 28, 2012, 4 pages total.
Communication (Decision of Refusal) issued by the Japan Patent Office in Japanese Patent Application No. 2014-510468, mailed Feb. 7, 2017, 13 pages total.
Communication (Notification of Reasons for Refusal) issued by the Japan Patent Office in Japanese Patent Application No. 2014-510468, mailed Mar. 22, 2016, 8 pages total.
Office Action for EA Application No. 201391671, dated Nov. 2, 2016, 4 pages total.
Iscove, N.N. et al., "Colony Formation by Normal and Leukemic Human Marrow Cells in Culture: Effect of Conditioned Medium From Human Leukocytes" Blood: The Journal of Hematology (1971) vol. XXXVII, No. 1, pp. 1-5.
Ware, J. et al., "Design and Testing of Improved Spacesuit Shielding Components" Lawrence Berkeley National Laboratory (2002).
Written Opinion for PCT Application No. PCT/IL2016/050298 dated Jul. 11, 2016, 8 pages total.
Written Opinion of the International Searching Authority for International Application No. PCT/US2012/037335, dated Nov. 28, 2012, 6 pages total.
Dillard, M.A., "Radiation Shielding Garment Technologies" (2015) accessed from: https://www.nasa.gov/sites/default/files/atoms/files/radiationshieldinggarmenttechnologies.docx, 2 pages total.
European Communication (Extended European Search Report) for European Application No. EP 16764351.9, dated Oct. 9, 2018, 10 pages total.
Wilson, J.W. et al., "Spacesuit Radiation Shield Design Methods" (1997) accessed from: https://ntrs.nasa.gov/archive/nasa/casi.ntrs.nasa.gov/20060046504.pdf, 16 pages total.
European Communication (Extended European Search Report) for European Application No. EP 18187144.3, dated Dec. 20, 2018, 11 pages total.
European Communication (pursuant to Article 94(3) EPC) for European Application No. EP 18187144.3, dated Nov. 17, 2020, 9 pages total.

* cited by examiner

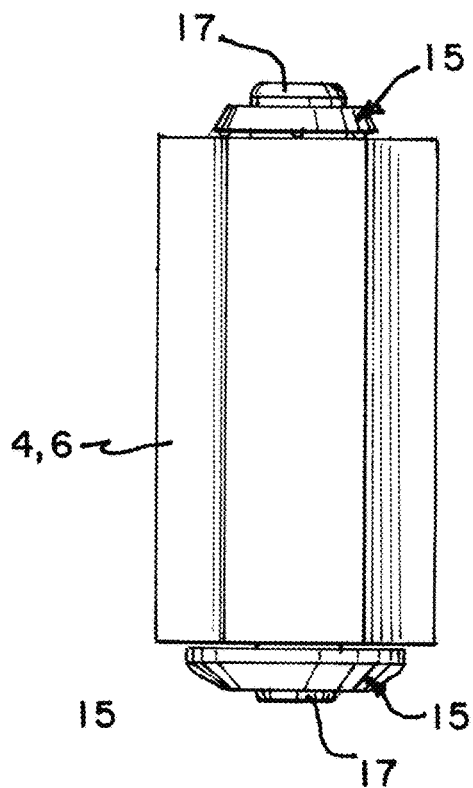
FIG. 9
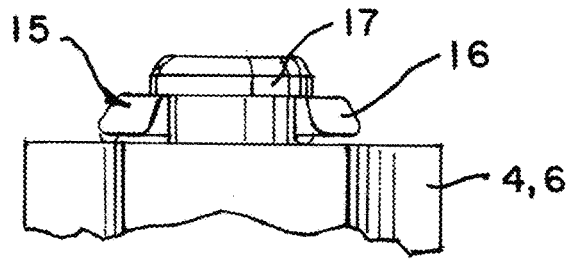
FIG. 10A
FIG. 10B
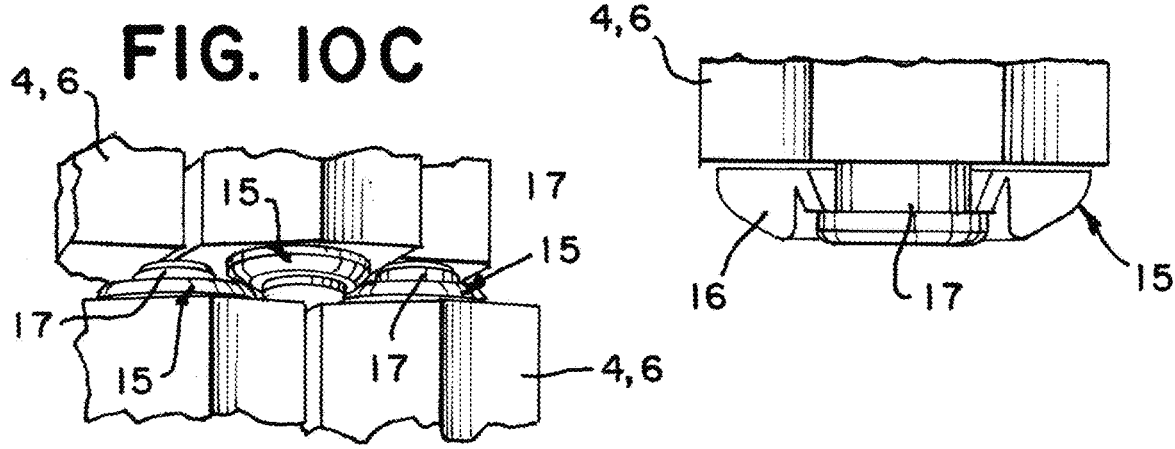
FIG. 10C

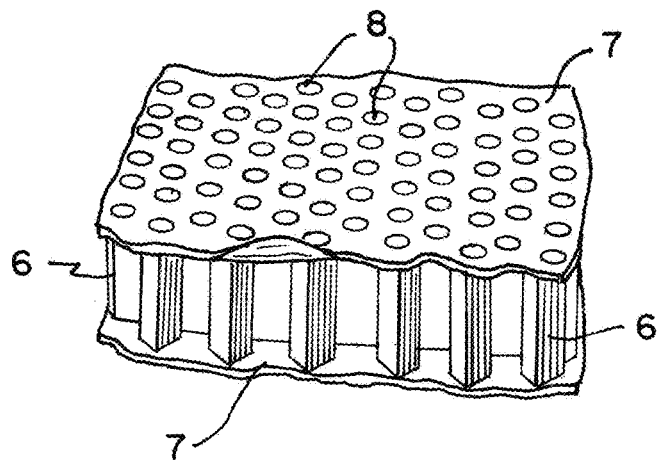
FIG. 11A
FIG. 11B
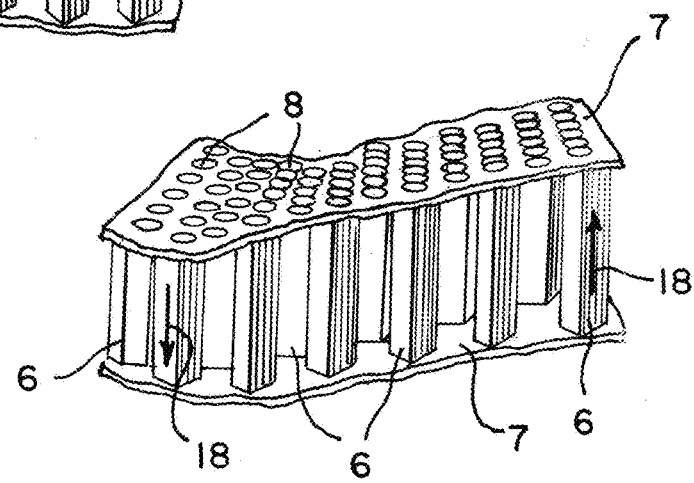
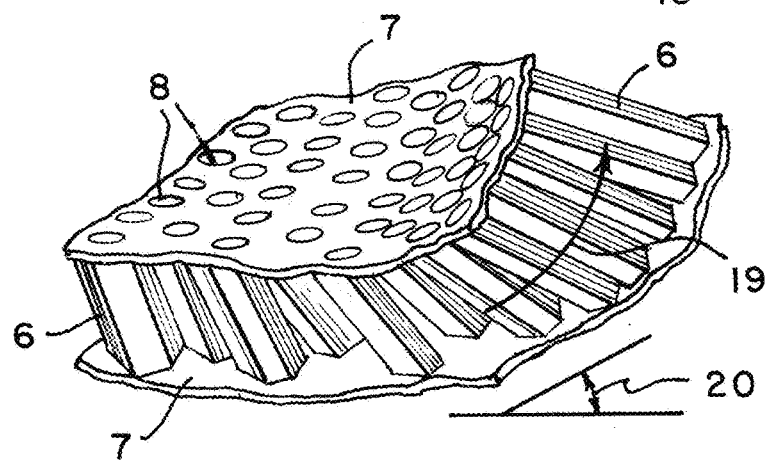
FIG. 11C
FIG. 11D
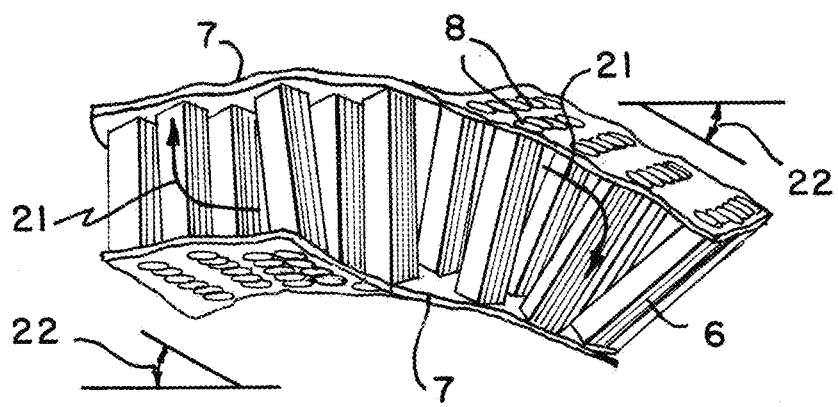

Reducing Parasitic Mass of AstroRad personal Radiation Shielding

MATERIAL CONFIGURATION ENABLING FLEXIBILITY OF A STRUCTURE USING RIGID COMPONENTS

CROSS-REFERENCE TO RELATED APPLICATIONS

This application is a continuation of U.S. patent application Ser. No. 17/686,524 filed Mar. 4, 2022, which is a divisional of U.S. patent application Ser. No. 16/053,101, filed Aug. 2, 2018, now U.S. Pat. No. 11,276,505, which claims priority to U.S. Provisional Patent Application No. 62/540,127, filed Aug. 2, 2017. The entire contents of which are hereby incorporated by reference.

FIELD OF THE INVENTION

The present invention relates to material configuration for a wearable garment for personal radiation protection against space radiation.

BACKGROUND

Radiation and synergistic effects of radiation may place the crew of a space mission at significant risk for acute radiation sickness from a major solar event or artificial event, such that the mission or crew survival may be placed in jeopardy. Exposure to radiation from solar events or to galactic cosmic rays (GCRs) may also increase the likelihood of cancer in space travelers many years after the completion of the mission.

In addition to protracted exposure to space radiation, acute solar events may impact crew health and performance during their mission and therefore endanger its completion and their safe return to earth. Beyond Low Earth Orbit, the protection of the Earth's atmosphere is no longer available, such that increased shielding and protective mechanisms are necessary in order to prevent acute radiation sickness and impacts to mission success or crew survival. It is of utmost importance that appropriate protection strategies are developed. This need is underlined given the prevailing plans to send humans to Mars over the next decades.

It would be desirable if it were possible to shield the entire habitable area of the spacecraft so that solar energetic particles and galactic cosmic rays are reduced to benign levels. Unfortunately, this approach is not a currently feasible one. The reason for this is that to effectively shield an entire crew module, such as the one on the Orion Multi-Purpose Crew Vehicle, very large quantities of shielding material would be necessary. Given the cost of added weight at liftoff, this is a serious bottleneck. NASA's current estimate of putting a pound of payload into Earth's orbit is around $10,000 per pound. Other alternatives range from $9,100 per pound to $43,000 per pound. Also, any significant addition to payload weight may increase travel time to destination, thereby increasing the radiation exposure time.

One proposed technological solution based on the whole spacecraft shielding which attempts to minimize the burden of the shielding weight is provided by Cohen, Marc M. (1997). Design Research Issues for an Interplanetary Habitat (SAE 972485). In SAE Transactions, Journal of Aerospace, vol. 106, sec. 1, p. 967-994 (hereinafter referred to as "Cohen"). Cohen suggested using water as shielding material. This would allow the shielding material to double also as a drinking water reserve for the astronauts. The problem with this approach is that in order to provide sufficient shielding of approximately 30 grams/cm$^2$ to a crew module similar to the one present on Orion, some 42 metric tons of water would be necessary. Also, water for consumption by astronauts is produced over the course of the journey due to constant burning of hydrogen fuel so such a vast reserve of water would greatly increase launch cost with little added benefit. Finally, this shielding solution like any whole spacecraft shielding solution is applicable only to protecting astronauts inside the spacecraft and does nothing to protect astronauts assigned to EVAs (extravehicular activities).

Another proposed technological solution is that provided by Cohen, Marc M., Flynn, Michael T., and Matossian, Renee L. (2012). Water Walls Architecture: Massively Redundant and Highly Reliable Life Support for Long Duration Exploration Missions (GLEX-2012.10.1.9x12503) (hereinafter referred to as "Flynn"). Flynn suggests a solution coined "Water Walls". In his proposed solution, Flynn suggests launching the required water separately from the spacecraft using a cheaper launch system and then pumped into the spacecraft in space. The limitations of this approach are like that of Cohen, as even though a cheaper launch system is used, it still entails an enormous extra cost and once again does nothing to protect astronauts assigned to EVAs such as spacewalks and planetary tours. Additionally, even though the weight problem at liftoff is managed, there would still be an increased burden on propulsion in space once water is added.

Another alternative approach is based on repositioning of the crew and cabin content in cases of higher than normal dose rates such as may arise from a solar particle event (SPE). This strategy lacks designated shielding and uses existing mass to reduce dose rates. While this is a useful strategy, its obvious shortcoming is that it does not provide protection from galactic cosmic rays (GCRs) on an ongoing basis and as for SPEs, this strategy relies heavily on the ability to accurately forecast these events, a capability which is still lacking at this point in time. Moreover, this solution requires the crew to be sheltered in a confined space for several days and up to a few weeks, reducing their effectivity dramatically.

Another alternative approach to countering the space radiation challenge is based on a line of research that is aimed at the development of drugs that mimic or enhance the body's natural capacity to repair damage caused by radiation. While there has been some progress in drug countermeasure development for terrestrial ionizing radiation such as gamma radiation, very little progress has been made towards countermeasures for space radiation. A serious concern with this approach is that any future drug would probably have to be administered several hours before exposure, necessitating very advanced and accurate SPE forecasting capabilities which still do not exist. Another concern with this approach is based on recent findings that long-term space travel adversely affects the stability of pharmaceuticals likely due to protracted exposure to space radiation and constant vibration. See, for example, Eskiocak, U., S. B. Kim, A. I. Roig, E. Kitten, K. Batten, C. Cornelius, Y. S. Zou, W. E. Wright, and J. W. Shay. CDDO-Me Protects against Space Radiation-Induced Transformation of Human Colon Epithelial Cells. Radiation Research Society July 2010: Vol. 174, Issue 1, pg(s) 27-36, https://doi.org/10.1667/RR2155.1.

Drugs which are being considered under this approach include antioxidants which capture free radicals that cause DNA mutations and inhibitors of cell division giving the cells time to express genes for DNA repair enzymes before harmful mutations can be duplicated.

A major advantage of light-weight radiation protection panels or personal shielding solutions is that by wearing shielding directly adjacent to the area of coverage (i.e. on the surface of the body), the solid angle of coverage is maximized thereby significantly reducing the mass of shielding required to provide equivalent protection to individual astronauts. However, while existing protective whole-body clothing can protect from low energy ionizing radiation, it offers little protection from highly penetrating energetic ionizing radiation which is present in space. Space radiation attenuating devices and garments have been described in the past, but most were developed to offer either whole-body protection, or to cover as much of the body as possible. Due to the significant weight of radiation-attenuating materials, existing shielding solutions are made using only thin layers of radiation-attenuating material, to remain bearable by their wearers. These thin layers attenuate radiation transmission in a manner that is insufficient for preventing the acute health effects that result from exposure to high doses of radiation (i.e. Acute Radiation Syndrome) or for preventing the carcinogenic effects resulting from protracted exposures. Simply increasing the thickness of shielding over the body of the wearer would be prohibitive given the added weight at liftoff and the significant ergonomics barrier imposed by the resulting bulkiness of such a whole-body suit. Thus, there is an urgent need for comfortable, ergonomic shielding solutions for radiation in space.

These shielding solutions should be not only mass-efficient in providing a high degree of protection per unit mass, but also volume-efficient in providing a high degree of protection per unit volume. Dense materials provide high mass per volume; however, they tend to be in the solid phase which creates challenges in terms of comfort and ergonomics.

SUMMARY

There is thus provided, in accordance with some embodiments of the present invention, a material configuration or light-weight radiation protection panel allowing the incorporation of rigid, solid, or shielding material connected in a flexible material such that the structure may provide flexibility required for the ergonomic constraints of a wearable garment and other applications.

In accordance with some embodiments of the present invention, the other potential applications include but are not limited to: body armor, flotation devices, medical devices, prosthetics, packaging, toys, furniture, automotive, biomedical, building architecture, sports equipment, footwear, thermal insulation and other wearable applications.

Furthermore, in accordance with some embodiments, this configuration can comprise adjacent repeated units of shielding material in different geometrical shapes that can slide against each other in a layer to aid in the flexibility of the entire unit.

Furthermore, in accordance with some embodiments, the shielding material may be rigid, semi-rigid, or flexible.

Furthermore, in accordance with some embodiments, the shielding material may be connected in a friction minimizing material selected from the group of materials consisting of Polytetrafluoroethylene (PTFE, Teflon), polyamide-imide (PAI), Nylon 6-6, Nylon 4-6, graphite, graphite powder, acetal homopolymer or carbon fiber, and a lubricant.

Furthermore, in accordance with some embodiments, the shielding material comprises an outer solid material shell defining an internal cavity. The internal cavity can be empty, partially filled, filled, or completely filled. The internal cavity may be filled with a solid, liquid, gas, or combination. For example, in some embodiments, the internal cavity may be filled with water.

Furthermore, in accordance with some embodiments, the shield material outer solid material shell may be of a variable density.

Furthermore, in accordance with some embodiments, the shielding material may be connected by a flexible material. The flexible material may be a fabric or a textile.

Furthermore, in accordance with some embodiments, the shielding material comprise one layer or multiple layers.

Furthermore, in accordance with some embodiments, the shielding material comprising one layer or multiple layers connects to the flexible material.

Furthermore, in accordance with some embodiments, multiple light-weight radiation protection panels comprise wearable light-weight protection attire. The light-weight radiation protection panels are removable from the wearable light-weight protection attire. Each light-weight radiation protection panel may be removed and laid flat, to consume minimal volume. The light-weight radiation protection panels may be place in cargo transport bag or bags. The light-weight radiation protection panels may be used to augment the radiation protection of space craft or storm shelter within the space craft.

Furthermore, in accordance with some embodiments, the flexible material may be flexible and stretchable.

Furthermore, in accordance with some embodiments, the flexible material comprises one or more of materials that include fire resistant or flame-retardant properties to meet safety standards for a given application.

Furthermore, in accordance with some embodiments, the flexible materials comprise phase change materials that provide passive thermal regulation through the absorption, storage, and release of heat.

Furthermore, in accordance with some embodiments, the flexible materials comprise one or more materials selected from natural fibers such as cotton or wool, yarns, fabrics, polyamide, polyester, acrylic, rayon, acetate, rubber, viscose, nomex, aramid, polyethylene fibers or blends of these materials.

Furthermore, in accordance with some embodiments, the layer or layers of shielding material may be attached to the flexible material using various fastening or welding techniques.

Furthermore, in accordance with some embodiments, the shielding material when used as a radiation attenuation material for protection against space radiation comprises one or more materials selected from the group of materials consisting of Carbon nano-materials with absorbed H, Metal hydrides such as LiH, $MgH_2$, $LiBH_4$, $NaBH_4$, $BeH_2$, $TiH_2$ and $ZrH_2$, Pd (and alloys) with absorbed H, Hydrocarbons (polyethylene, polypropylene, $(CH_2)n$) with or without boron, high density polyethylene (HDPE), Polyethylene (PE), Cross-linked polyethylene (PEX), Linear low-density polyethylene (LLDPE), Low-density polyethylene (LDPE), Medium density polyethylene (MDPE), Ultra-high-molecular-weight polyethylene (UHMWPE), hydrogen-loaded nanostructured polyaniline polymers (PANI), hydrogen-loaded boron nitride nanotubes (BNNT), Quasi-crystals, e.g. $(TiZrNi)_1$ $H_{1.7}$, Condensed hydrogen (solid), and other hydrogen rich materials.

Furthermore, in accordance with some embodiments, the shielding material may be composed of naturally occurring solid phase materials such as metal, wood, stone, rubber, or minerals.

Furthermore, in accordance with some embodiments, the shielding material may be composed of synthetic materials including plastics or other man-made materials and composites.

Furthermore, in accordance with some embodiments, the light-weight radiation protection panel may allow bending, twisting, stretching, linear movement and resistance to shear force to a degree greater than the shielding material itself.

Furthermore, in accordance with some embodiments, this degree of movement may be affected by the height and thickness of individual units of shielding material that constitute the material configuration.

Furthermore, in accordance with some embodiments, the adjacent repeated units of shielding material in different geometrical shapes comprise one layer of uniform thickness or variable thickness or comprise stacked or staggered multiple layers to provide the desired uniform or variable thickness.

Furthermore, in accordance with some embodiments, the thickness of the shielding material may be proportional to varying radiation attenuation levels when used in a radiation shielding garment to provide selective shielding.

Furthermore, in accordance with some embodiments, the light-weight radiation protection panel may provide increased protection to radiation sensitive organs.

Furthermore, in accordance with some embodiments, the radiation sensitive organ is an organ selected from the group of organs consisting of: pelvis, bone marrow, lungs, ovaries, uterus, testes, stomach, small intestine, large intestine, thyroid and breast. The light-weight radiation protection panels may be combined or partially overlap to form wearable attire including, but not limited to, a jacket, a vest, shorts, pants, head covering, or similar.

Furthermore, in accordance with some embodiments, the light-weight radiation protection panel may protect any animal tissue including, but not limited to, an animal's skin or brain. The light-weight radiation protection panels may be combined or partially overlap to form wearable attire including, but not limited to, a hat, helmet, hood, face-mask, or similar. In the absence of a solar particle event it may be advantageous to utilize shielding to protect one's brain from galactic cosmic rays. Thus, vest may be reconfigured into a dome shape that may be worn around one's head. This would be especially advised when rigorous movement is not required such as during sleep.

BRIEF DESCRIPTION OF THE DRAWINGS

Examples are described in the following detailed description and illustrated in the accompanying drawings in which:

FIG. 1A being the back and FIG. 1B being the front view. The areal density of tissue shielding from the surface of the body (based on Visible Human Project Female Data) to foci of protection centered on stem cell niches within the ovaries, lungs and iliac bone marrow.

FIG. 2A being the back and FIG. 2B being the front view. The areal density of tissue shielding from the surface of the body (based on Visible Human Project Female Data) to foci of protection centered on stem cell niches within the iliac bone marrow.

FIG. 5A contains solid and rigid adjacent uniform hexagonal poles labelled as 6 attached to a fabric labelled as 7 on both sides assembled into one layer of uniform thickness. FIG. 5A contains two layers with the individual layer corresponding to the one described in FIG. 5A and the top layer staggered on top of the bottom layer. These two examples illustrate two ways of assembling rigid and solid units of hexagons either as one layer of uniform thickness or two layers of uniform thickness. The hexagonal poles can slide against each other and the fabric provides flexibility. The staggered layer also overcomes the shortcoming of gaps that maybe created due to certain movements of the configuration.

FIG. 9 includes a hexagonal pole as described in FIG. 4-6, containing snap button labelled as 15 for attachment to fabric or a textile. This figure illustrates a different way of attaching the fabric to the shielding material using snap buttons. The snap buttons can be made of flexible material thus adding to the flexibility of the entire unit and efficient movement of the fabric with the hexagonal poles.

FIGS. 10A, 10B and 10C illustrate the different components of a snap button attached to a hexagonal pole described in FIG. 9 that contains rings labelled as 16 and pins labelled as 17. The rings can be of different areas depending on whether they are present between the layers in case of multiple layers or outside the layers. The different components of the snap button and how it is attached to the fabric can be adjusted to accommodate different layers of the panels that contain the configuration to provide durability and the right movement in that specific area.

FIGS. 11A-11G show various movements and degree of flexibility of the configuration that is described in FIGS. 5 and 6. FIG. 11A illustrates a perspective view of the configuration in static state when no force or load is applied to it. FIG. 11B illustrates a perspective view of configuration when shear force indicated by the arrows labelled as 18 is applied on it in opposite directions. The movement under this type of force is facilitated by the fabric and the sliding of the hexagons against each other where the force is applied. FIG. 11C illustrates a perspective view of the configuration when it is bended in the movement as shown by the arrow labelled as 19 to an angle labelled as 20. The bending movement is facilitated by the fabric and the opening of small gap between the hexagons. FIG. 11D illustrates a perspective view of the configuration when it is twisted as shown by the arrows labelled as 21 to an angle labelled as 22. This movement is facilitated by fabric and the ability of the hexagons to slide against each other and be able to create small gaps. FIG. 11E illustrates a perspective view of the configuration in lateral bending movement indicated by the arrow labelled as 23 to an angle described as 24. FIG. 11F illustrates a perspective view of the configuration in linear movement indicated by the arrows labelled as 25 assuming the length of the configuration to be 10 cm as illustrated by the line labelled as 26. This movement is facilitated solely by the fabric thereby allowing movement of an otherwise rigid material. FIG. 11G shows deflection when bending force labelled as 28 is applied to the configuration and both the ends of configuration are fixed as depicted by label 27.

Also, the shielding material can be an outer solid material shell defining an internal cavity. The internal cavity can be empty, partially filled, filled, or completely filled. The internal cavity may be filled with a solid, liquid, gas, or combination. For example, in some embodiments, the internal cavity may be filled with water. This can for uniform shielding material thickness yet differing radiation attenuation levels.

Figure 13:
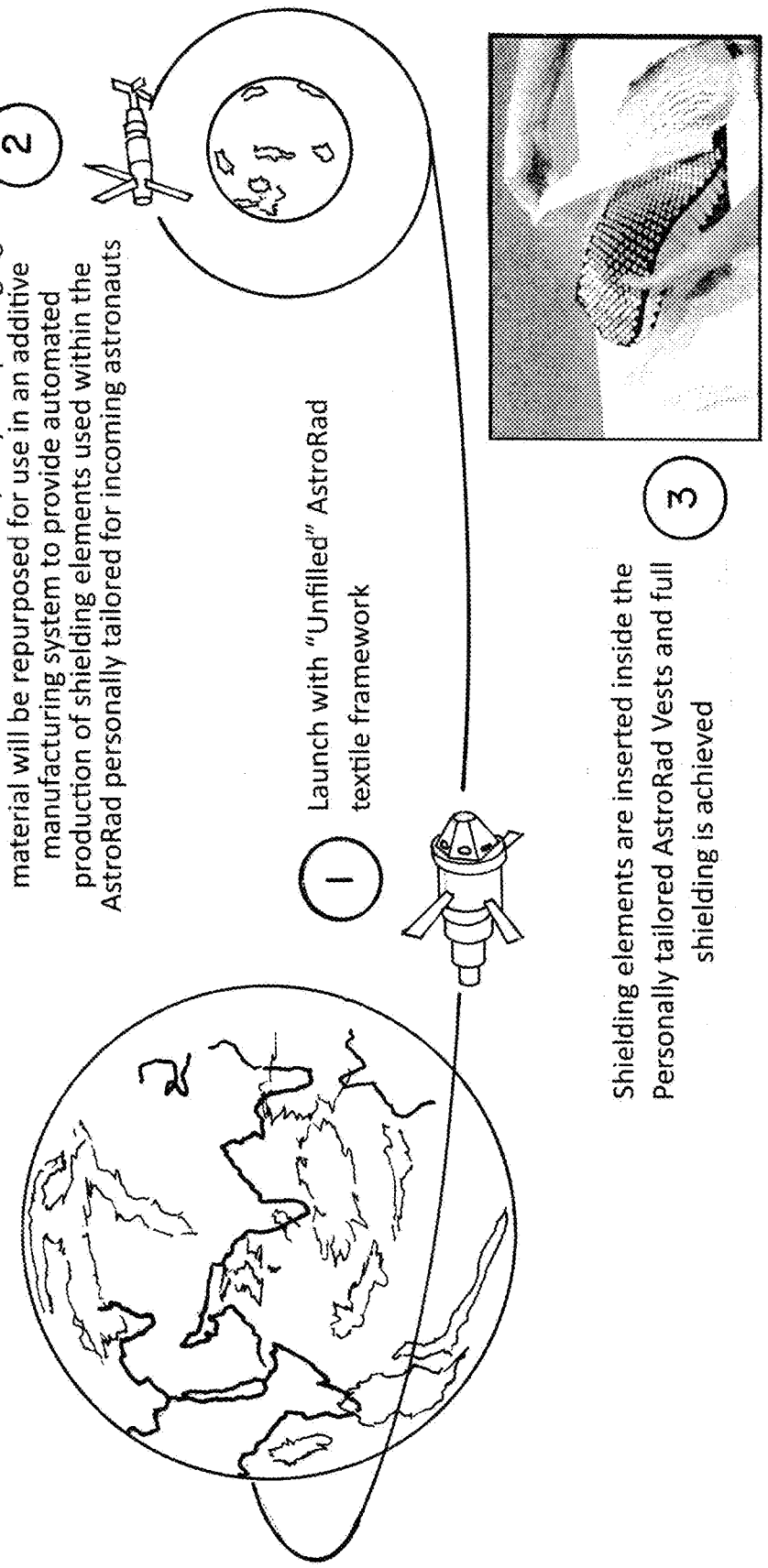

FIG. 13 shows the potential recycling of on-board plastic materials using additive manufacturing techniques. While the configuration may be constructed on Earth and launched with astronauts for missions, it may also be manufactured in space using repurposed (recycled) material on-board using additive manufacturing capabilities which already exist on the International Space Station (ISS) and will very likely be expanded and included in future space architectures such as the planned NASA Deep Space Gateway. Recycling on-board plastic materials would allow for an up to 90% reduction in parasitic mass of personal radiation shielding equipment for solar particle events (SPE). The repurposed or recycling of the material enables the construction of the light-weight radiation protection panels in space.

Figure 14:
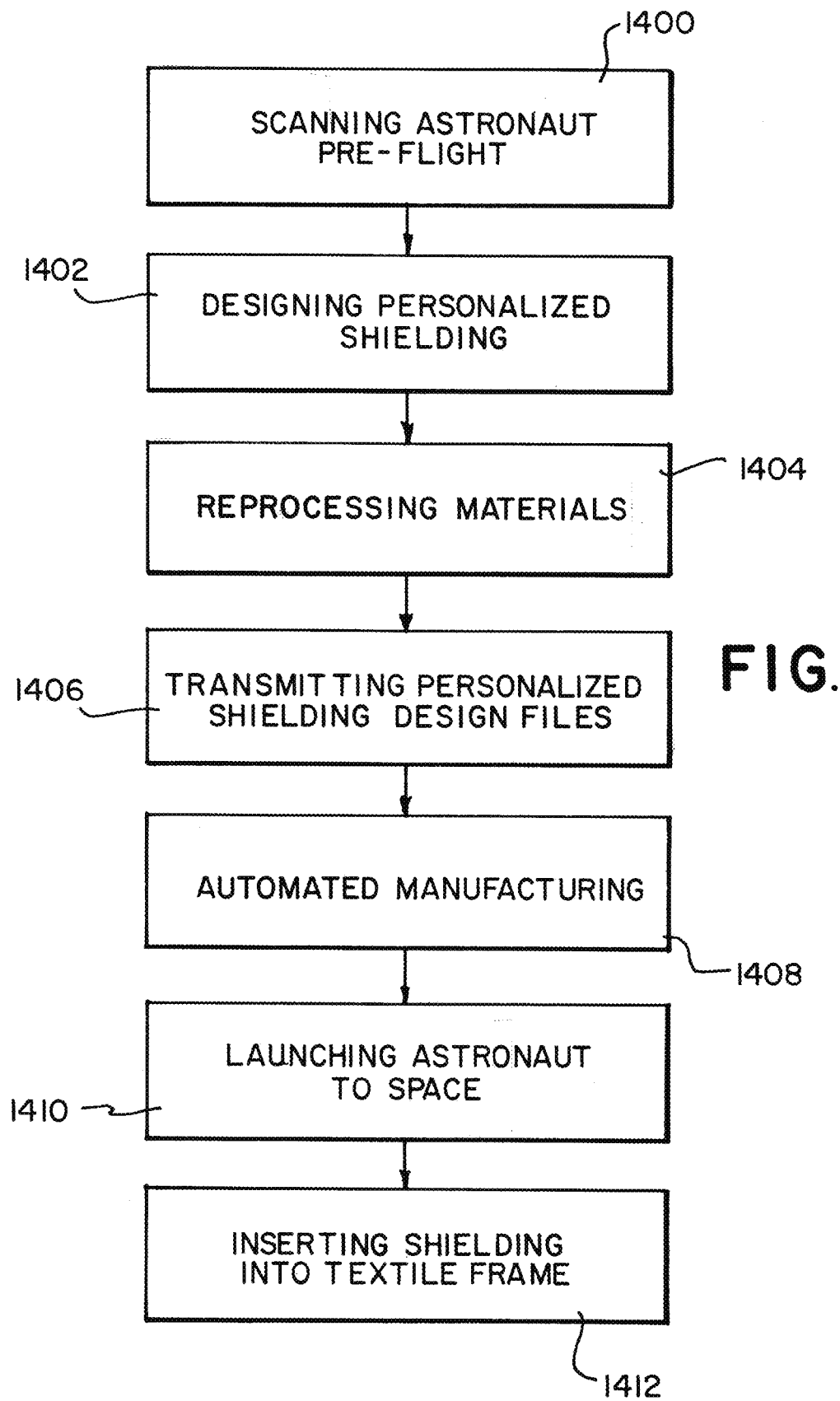

FIG. 14 shows one method of preparing and manufacturing personal radiation shielding equipment having the steps of scanning an animal; determining the animal's natural radiation attenuation tolerance according to internal and external anatomy; and designing a personalized light-weight radiation protection panel. The personalized light-weight protection panel's radiation attenuating characteristics are related to the radiation attenuation tolerance of tissue protected by the personalized light-weight protection panel. The construction a radiation protection layer comprising a plurality of a shielding material wherein each said shielding material selected having radiation attenuating characteristics, a flexible material connecting the plurality of shielding material, and that the personalized light-weight radiation protection panel comprises flexibility greater than an individual shielding material. In some embodiments the scanning of the animal can occur on earth. In some embodiments the scanning of the animal can occur in space. In some embodiments, the light-weight radiation protection panels can be constructed on earth. In some embodiments, the light-weight radiation protection panel can be constructed in space after producing a variety of uniform sizes of the shielding material; inserting the variety of uniform sizes of the shielding material into the flexible material; locating the shielding material within the flexible material in accordance the animal's natural radiation attenuation tolerance determined by the scan.

Figure 15:
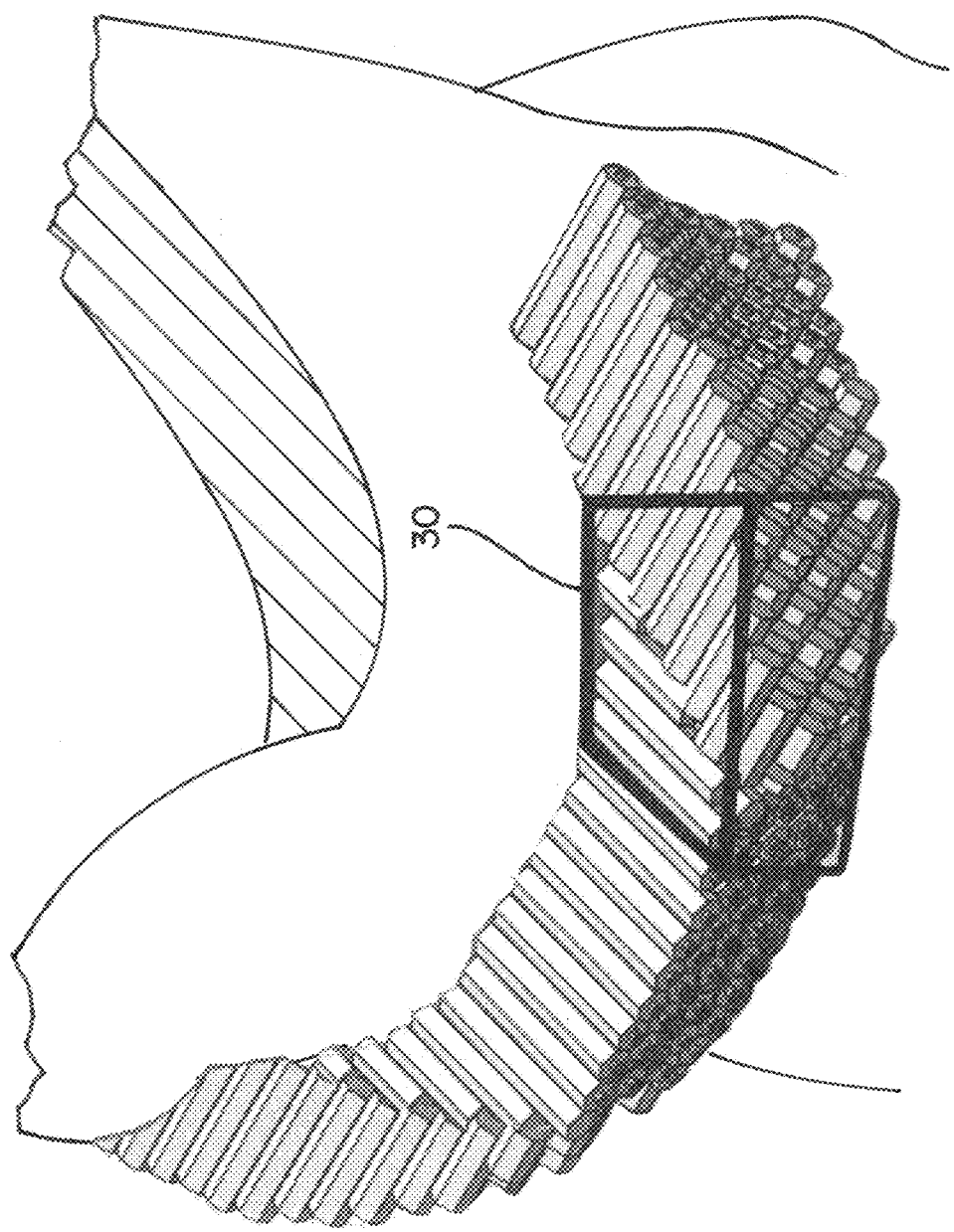

FIG. 15 shows a configuration designed with a number of different panels. The configuration can be designed with panels to overlap. Two panels overlap within the overlap area 30. The shielding materials within the overlapping portion of the panels can vary in size and/or length to maintain the desirable thickness. The overlap will occur between the panels where the panels can slide on top of each other in case a strong movement is needed. Friction minimizing material layers 31 may be included between overlapping panels to facilitate smooth motion as the overlapping panels slide against each other during adjustments, donning/doffing, or user movement.

Figure 16:
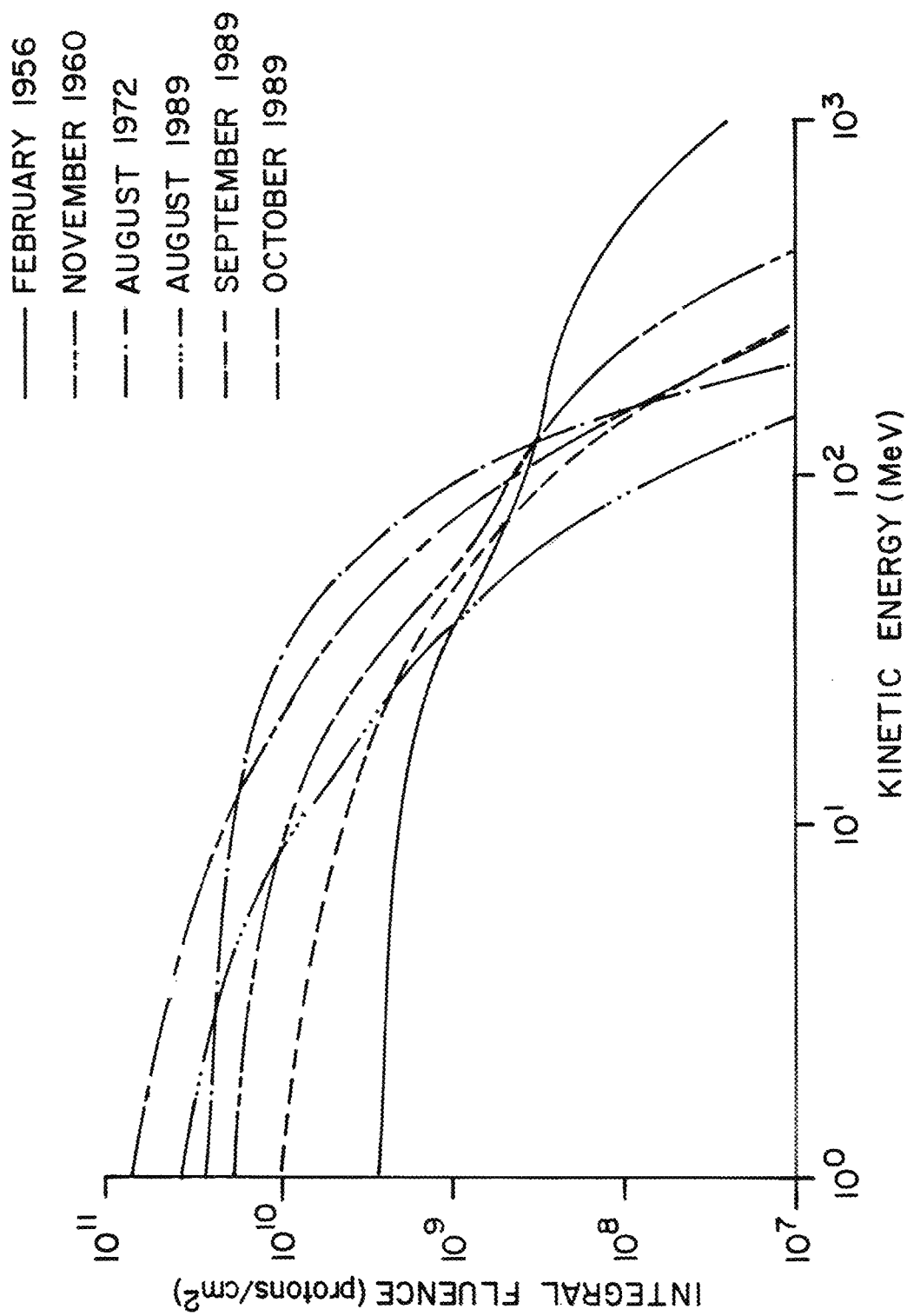

FIG. 16 illustrates the spectra of larger solar particle events.

Figure 17:
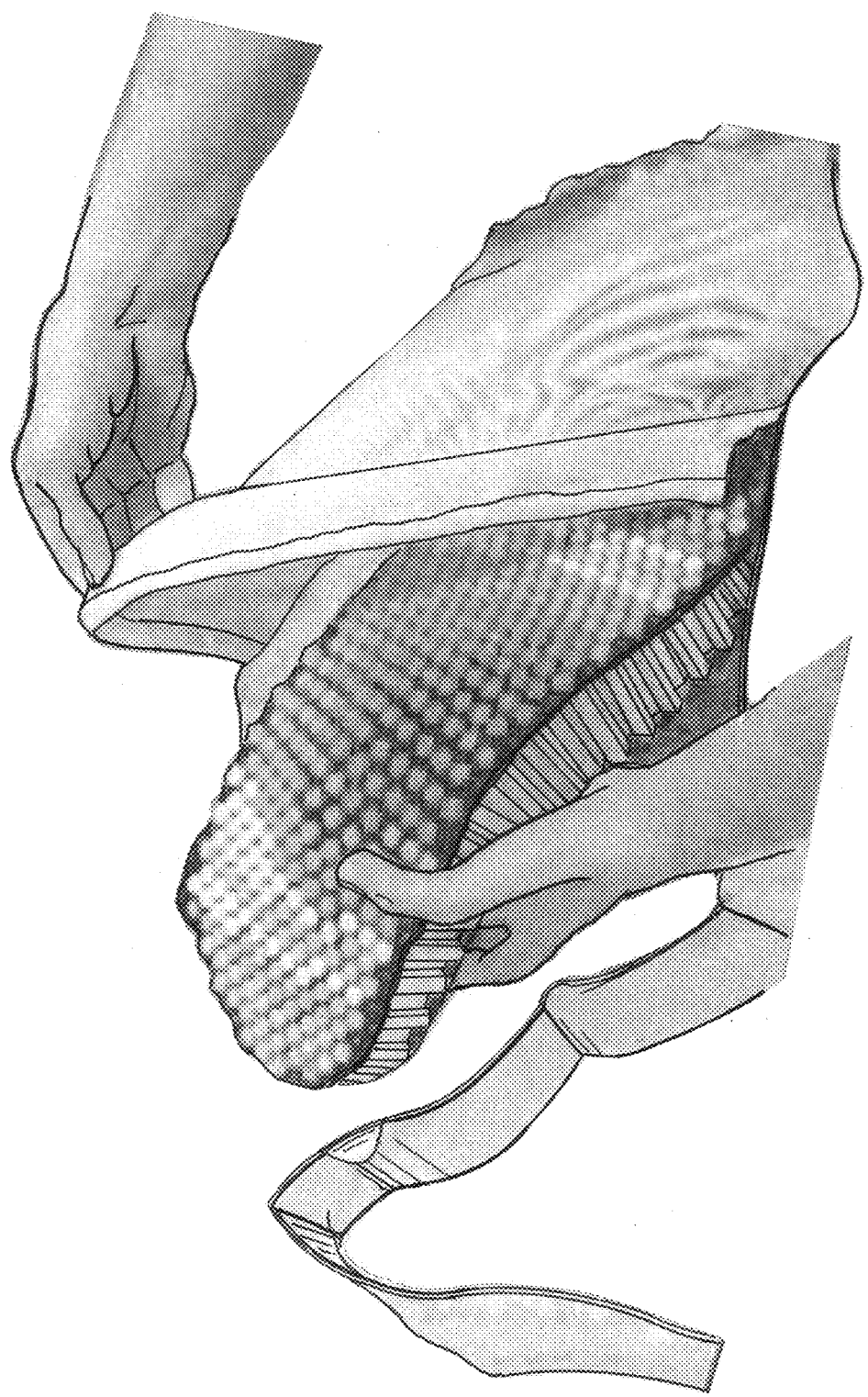

FIG. 17 illustrates the assembly of light-weight radiation protection panels inserted into a wearable garment.

DETAILED DESCRIPTION

Although examples are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

According to embodiments of the present invention, a configuration of material is described as such that it may use shielding material made of rigid or flexible components encapsulated in a fabric or textile that allows flexibility of the entire unit and that this configuration may allow rigid radiation attenuation material to be used in a wearable radiation shielding garment or other applications.

"Attenuation", in the context of the present invention, is meant to refer to reducing radiation passing through and also to fully blocking radiation from passing through.

"Radiation" in the context of the present invention may include ionizing radiation.

"Radiation" in the context of the present invention may include alpha radiation, beta radiation, gamma radiation, neutron radiation, x-ray radiation, ionized nuclei, or a combination thereof.

"Radiation", in the context of the present invention is meant to refer to radiation that is external radiation that has the potential to induce Acute Radiation Syndrome (ARS) or/and long-term health effects such as cancer.

"Space radiation" in the context of the present invention may include galactic cosmic rays (GCRs), solar particle events (SPEs), protons, medium energy protons, high energy protons, heavy ions (HZEs), heavy nuclei, secondary protons, primary or secondary neutrons, primary or secondary alpha radiation, primary or secondary beta radiation and primary or secondary gamma radiation.

External radiation that has the potential to induce health effects is any radiation that is of sufficient energy to penetrate the outer layer of a living body.

In some embodiments of the present invention, the configuration may include one or a plurality of layers of a shielding material that can slide against each other as illustrated in FIGS. 4-6 and FIGS. 8A and 8B.

Figure 5A:
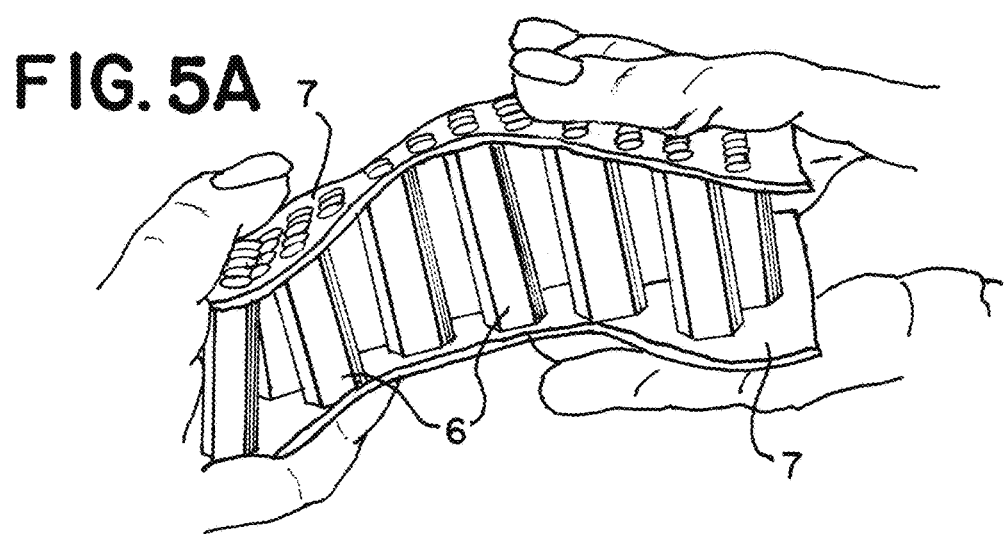
FIGS. 5A and 5B include a side view of an example of configuration.
Figure 5B:
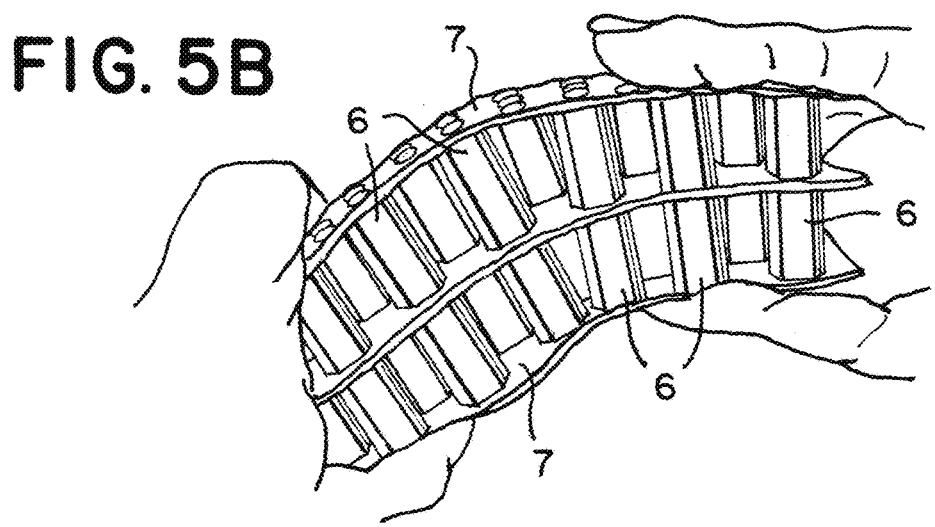
Figure 6:
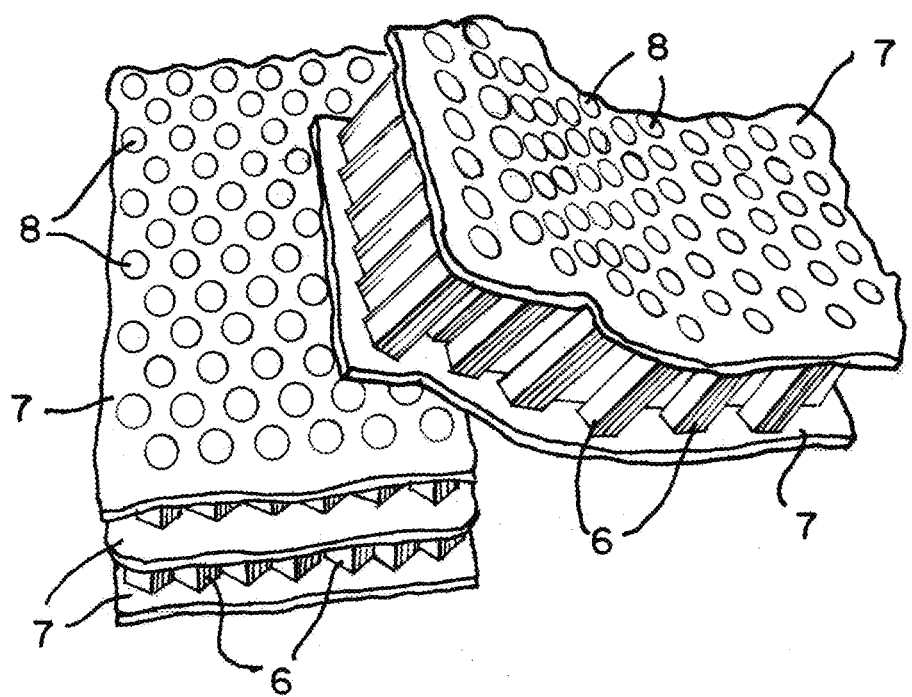
FIG. 6 includes a top and perspective view of configuration described in FIG. 11 where the uniform hexagonal poles are attached to the fabric on both sides using heat welding labelled as 8. The heat welding allows the attachment of the shielding material to the fabric without causing disassembly and allowing the movement of the entire unit as one.

In some embodiments of the present invention, the layers may be comprised of shielding material arranged in repeated units of various geometrical shapes adjacent to each other and held together by a fabric or textile on both sides as illustrated in FIGS. 5-6.

Furthermore, in accordance with some embodiments, the fabric or textile materials may comprise one or more materials selected from natural fibers such as cotton or wool, yarns, fabrics, polyamide, polyester, acrylic, rayon, acetate, rubber, viscose, nomex, aramid, polyethylene fibers or blends of these materials.

In some embodiments of the present invention, the shielding material of various geometrical shapes may be processed using techniques for molding plastic into various shapes such as extrusion or injection molding, the example of which is demonstrated in FIGS. 5-6 where the shielding material is processed into hexagonal poles.

In some embodiments, the configuration when used for radiation protection may contain radiation attenuating material in varying thicknesses or conversely by employing materials of different attenuation ability while maintaining the same thickness throughout. The radiation attenuation level of a specific section of the configuration herein would be inversely related to the radiation attenuation levels of the underlying tissue around the target for protection. The radiation attenuation levels of the underlying tissue around the target for protection are typically determined by the thickness and radiodensity of that tissue as illustrated in FIGS. 1A-3B and demonstrated by three levels in FIGS. 7A-7C.

Furthermore, in accordance with some embodiments, the shielding material may be of a density between 0.5 g/cm$^3$-1 g/cm$^3$. In another embodiment, the shielding material may be of a density between 0.5 g/cm$^3$-2 g/cm$^3$. In another embodiment, the shielding material may be of a density between 0.5 g/cm$^3$-3 g/cm$^3$. In another embodiment, the shielding material may be of a density between 0.5 g/cm$^3$-4 g/cm$^3$. In another embodiment, the shielding material may be of a density between 0.5 g/cm$^3$-5 g/cm$^3$. In another embodiment, the shielding material may be of a density between 0.5 g/cm$^3$-6 g/cm$^3$. In another embodiment, the shielding material may be of a density between 0.5 g/cm$^3$-7 g/cm$^3$. In another embodiment, the shielding material may be of a density between 0.5 g/cm$^3$-8 g/cm$^3$. In another embodiment, the shielding material may be of a density between 0.5 g/cm$^3$-9 g/cm$^3$. In another embodiment, the shielding material may be of a density between 0.5 g/cm$^3$-10 g/cm$^3$. In another embodiment, the shielding material may be of a density between 0.5 g/cm$^3$-11 g/cm$^3$. In another embodiment, the shielding material may be of a density between 0.5 g/cm$^3$-12 g/cm$^3$. In another embodiment, the shielding material may be of a density between 0.5 g/cm$^3$-13 g/cm$^3$. In another embodiment, the shielding material may be of a density between 0.5 g/cm$^3$-14 g/cm$^3$. In another embodiment, the shielding material may be of a density between 0.5 g/cm$^3$-15 g/cm$^3$. In another embodiment, the shielding material may be of a density between g/cm$^3$-16 g/cm$^3$. In another embodiment, the shielding material may be of a density between 0.5 g/cm$^3$-17 g/cm$^3$. In another embodiment, the shielding material may be of a density between 0.5 g/cm$^3$-18 g/cm$^3$. In another embodiment, the shielding material may be of a density between 0.5 g/cm$^3$-19 g/cm$^3$. In another embodiment, the shielding material may be of a density between 0.5 g/cm$^3$-20 g/cm$^3$. In another embodiment, the shielding material may be of a density between g/cm$^3$-21 g/cm$^3$. In another embodiment, the shielding material may be of a density between 0.5 g/cm$^3$-22 g/cm$^3$. In another embodiment, the shielding material may be of a density between 0.5 g/cm$^3$-23 g/cm$^3$.

Furthermore, in accordance with some embodiments, the arrangement of the shielding material into individual units which allows for sliding of the individual units of shielding material described herein may aid to the degree of movement provided by the fabric or textile as illustrated in FIGS. 11A-11G.

Furthermore, in accordance with some embodiments, this degree of movement can vary depending on the height and thickness of the shielding material. The degree of movement may be inversely proportional to the height and thickness of the individual unit of shielding material in the configuration.

Furthermore, in accordance with some embodiments, the shielding material when used as radiation attenuating material for space radiation may comprise one or more materials selected from the group of materials consisting of Carbon nano-materials with absorbed H, Metal hydrides such as LiH, MgH$_2$, LiBH$_4$, NaBH$_4$, BeH$_2$, TiH$_2$ and ZrH$_2$, Pd (and alloys) with absorbed H, Hydrocarbons (polyethylene, polypropylene or (CH$_2$)n) with or without boron, high density polyethylene (HDPE), Polyethylene (PE), Cross-linked polyethylene (PEX), Linear low-density polyethylene (LLDPE), Low-density polyethylene (LDPE), Medium density polyethylene (MDPE), Ultra-high-molecular-weight polyethylene (UHMWPE), Quasi-crystals, e.g. $(TiZrNi)_1 H_{1.7}$, and condensed hydrogen.

Furthermore, in accordance with some embodiments, the shielding material may be composed of naturally occurring solid phase materials such as metal, wood, stone, rubber, or minerals.

Furthermore, in accordance with some embodiments, the shielding material may be composed of synthetic materials including plastics or other man-made materials and composites.

Furthermore, in accordance with some embodiments, the staggered layers diminish the gaps that are created due to the movement of the individual units of shielding material.

Furthermore, in accordance with some embodiments, the use of multiple layers allows the use of different materials in different layers that can accommodate specific requirements of different applications.

Figure 1A:
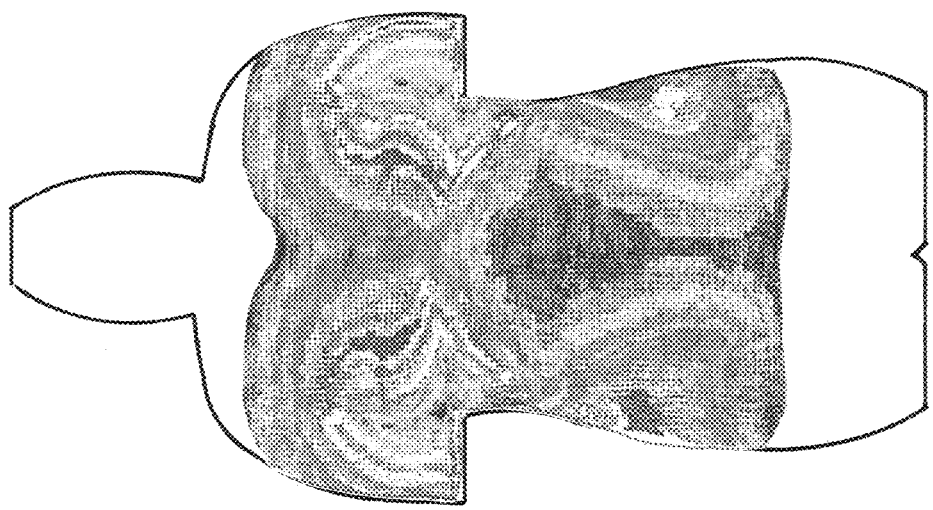
FIGS. 1A and 1B show a Surface Map of tissue Areal Density Shielding to Ovaries, Lungs and Iliac Bone Marrow.
Figure 1B:
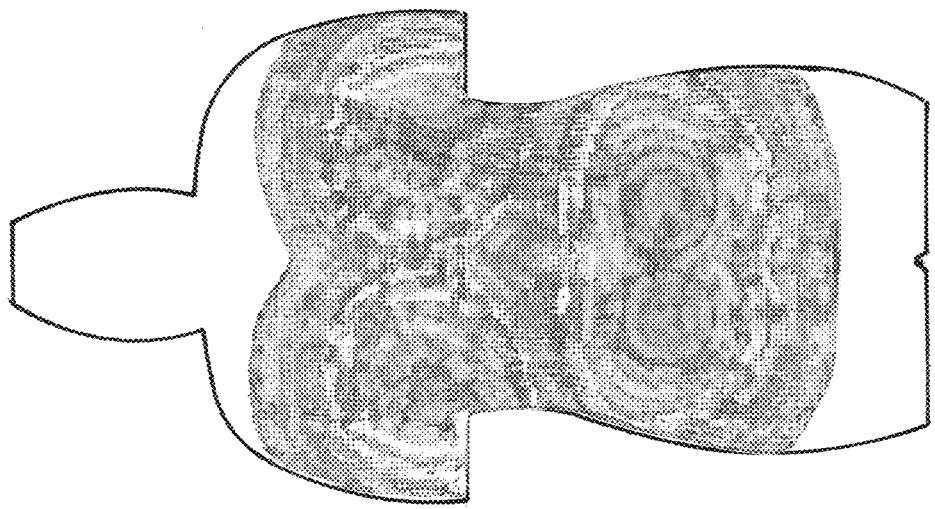
Figure 2A:
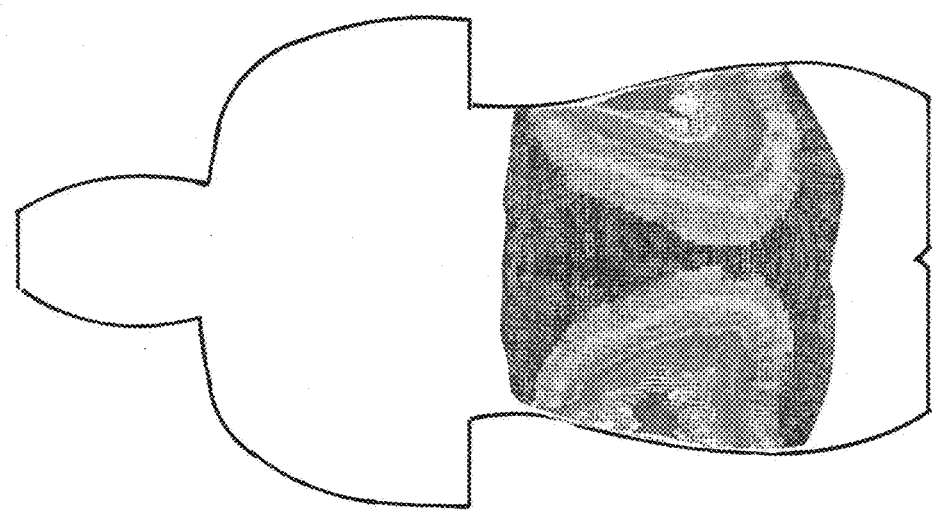
FIGS. 2A and 2B show a Surface Map of tissue Areal Density Shielding to the Iliac Bone Marrow.
Figure 2B:
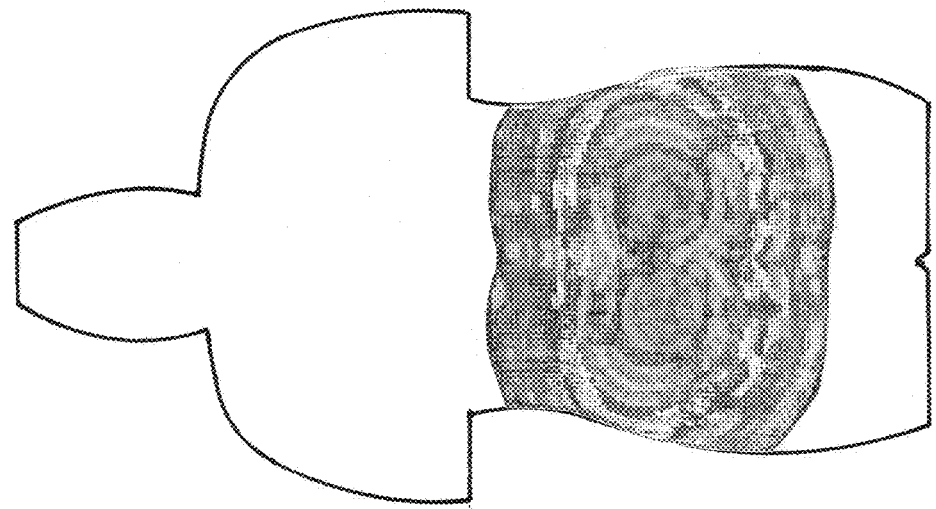
Figure 3A:
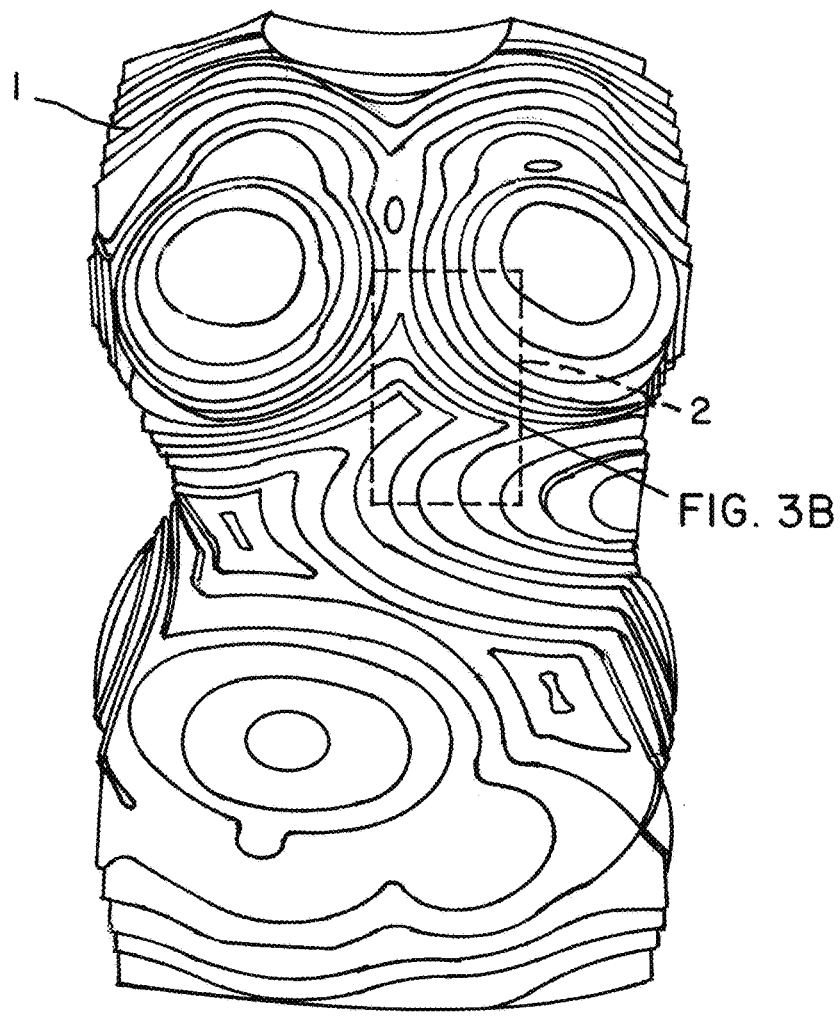
FIGS. 3A and 3B show a front and perspective section view of the material configuration with varying thickness labelled as 3 that corresponds to a specific part of the radiation protection vest labelled as 1 based on surface map of tissue areal density shielding described in FIGS. 1 and 2 and labelled as 2. The material configuration described in this figure has a variable thickness. This is inversely proportional to the surface map of tissue areal density shielding that uses non-uniform or selective shielding that is directly proportional to the radiation sensitivity and self-shielding provided by the body to those tissues, organs and the stem cells contained within. The lines on the radiation protective device 1 shows the varying thickness of radiation attenuation material that should be used in that region. The material configuration 3 thus needs to contain as assembly of radiation attenuation material that will follow the thickness described for each region of the radiation protection device.
Figure 3B:
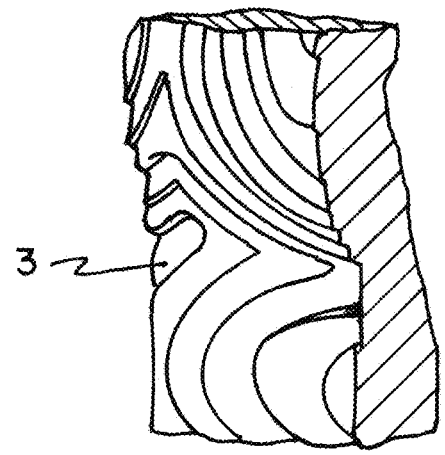
Figure 4:
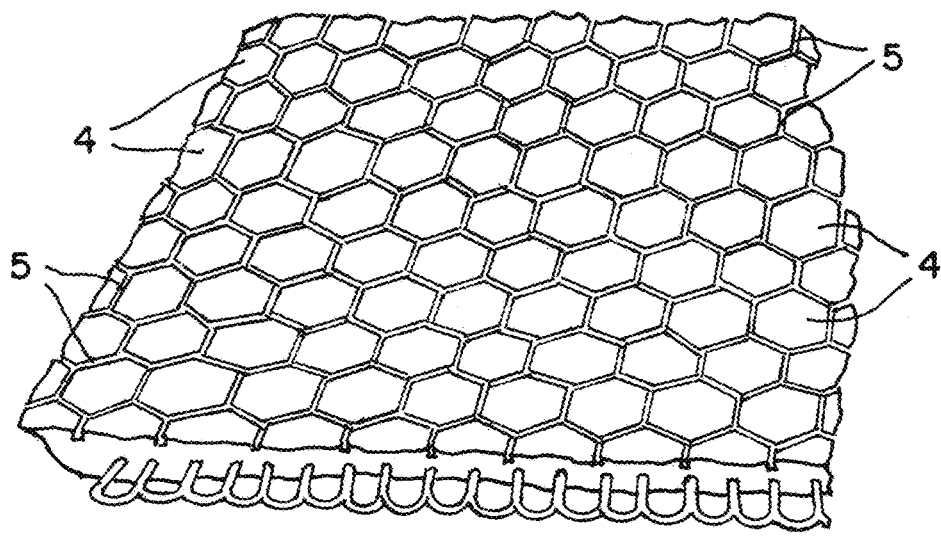
FIG. 4 includes a perspective view of an example of configuration containing rigid non-uniform solid hexagonal pieces labelled as 4 whereas the varying thickness is described by lines of elevation labelled as 5. This figure contains design that allows the use of rigid and solid hexagonal pieces of varying thickness. This design can be used for various applications where non-uniform assembly of geometrical shapes is required. This figure only illustrates three-dimensionally extruded hexagons but can be used for other geometrical shapes including circles, triangles, squares, rectangles, polygons, etc.

Furthermore, in accordance with some embodiments, the layers of shielding material when used as radiation attenuating material may define a topography related to tissue radiation attenuation levels between points on the radiation attenuating component and the tissue resident stem cells contained within the target organ as illustrated in FIG. 3.

Furthermore, in accordance with some embodiments, the layers of radiation attenuating material when compiled may define a structure of varying radiation attenuation levels across its surface as illustrated in FIGS. 1A-3B.

Furthermore, in accordance with some embodiments, the layers of radiation attenuating material when compiled may define a structure of varying radiation attenuation levels across its surface said variation in thickness substantially inversely related to radiation attenuation levels of tissue present between a given point of the radiation attenuating component and the tissue resident stem cells.

Furthermore, in accordance with some embodiments, friction minimizing material may be provided between the layers of shielding material in order to permit movement and sliding.

Furthermore, in accordance with some embodiments, the friction minimizing material provided between the layers of shielding material may be selected from the group of materials consisting of Polytetrafluoroethylene (PTFE, Teflon), polyamide-imide (PAI), Nylon 6-6, Nylon 4-6, graphite, graphite powder, acetal homopolymer or carbon fiber, and a lubricant.

Furthermore, in accordance with some embodiments, the layer of shielding material may be attached to a fabric or textile as illustrated in FIGS. 5-6 to allow flexibility of the structure.

Furthermore, in accordance with some embodiments, the flexibility of the structure may be such that it may allow a significantly higher degree of movement than the shielding material contained in the structure in forward, backward, left and right direction.

Furthermore, in accordance with some embodiments, the structure may allow increased resistance to breaking than the shielding material contained in the configuration in terms of shear, tensile and compression forces.

Furthermore, in accordance with some embodiments, the structure may allow for the linear movement, which may be defined as the extension of a 10 cm long object such that when it is stretched in a single dimension, the extension is not less than 0.1 cm and not more than 1 cm. This concept is illustrated in FIG. 11f and the cm length is indicated by label 26.

In another embodiment, the structure may allow for linear movement, which may be defined as the extension of a 10 cm long object such that when it is stretched in a single dimension whether longitudinal or laterally, the extension is not less than 1 cm and not more than 3 cm. This concept is illustrated in FIG. 11f and the 10 cm length is indicated by label 26.

In another embodiment, the structure may allow for the linear movement, which may be defined as the extension of a 10 cm long object such that when it is stretched in a single dimension whether longitudinal or laterally, the extension is not less than 3 cm and not more than 5 cm. This concept is illustrated in FIG. 11f and the 10 cm length is indicated by label 26.

In another embodiment, the structure may allow for linear movement, which may be defined as the extension of a 10 cm long object such that when it is stretched in a single dimension whether longitudinal or laterally, the extension is not less than cm and not more than 10 cm. This concept is illustrated in FIG. 11f and the 10 cm length is indicated by label 26.

Furthermore, in accordance with some embodiments, this linear movement may be referred to as extension that takes place under tensile force.

Furthermore, the tensile strain generated by the tensile force is defined by the equation, Tensile strain=extension/length of the object or by the equation, Tensile strain=Tensile Force/Young's modulus of the object.

Furthermore, in accordance with some embodiments, the above equation implies that the tensile strain is inversely related to the Young's modulus and directly proportional to extension.

Furthermore, in accordance with some embodiments, as the configuration allows the rigid shielding material, with an infinite or high Young's modulus to be encapsulated in a fabric with a significantly smaller Young's modulus compared to rigid material, may allow for a much higher tensile strain or larger extension compared to rigid shielding material.

Furthermore, in accordance with some embodiments, the increased tensile strain may provide increased yield strength and may allow the configuration to deform elastically for a given force compared to a rigid shielding material.

Furthermore, in accordance with some embodiments, the structure may allow for longitudinal bending, defined as the forcing of the structure from a static form, as illustrated in FIG. 11A, from a longitudinal, cross-sectional view-point into an angled, curved form of up to 10 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 20 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 30 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 40 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 50 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 60 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 70 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 80 degrees. This concept is illustrated in FIG. 11C.

In another embodiment, the structure may allow for longitudinal bending, defined as the forcing of the structure from a static form, as illustrated in FIG. 11A, from a longitudinal, cross-sectional view point into an angled, curved form of up to 90 degrees. This concept is illustrated in FIG. 11C.

Furthermore, in accordance with some embodiments, the structure may allow for torsion, defined as the forcing of the structure from its static form, as illustrated in FIG. 11A, by exertion of a lateral force on one end about the longitudinal axis of the structure while an opposite lateral force is applied to the opposite end about said axis in a twisting manner, up to 10 degrees.

In another embodiment, the structure may allow for torsion, defined as the forcing of the structure from its static form, as illustrated in FIG. 11A, by exertion of a lateral force on one end about the longitudinal axis of the structure while an opposite lateral force is applied to the opposite end about said axis in a twisting manner, up to degrees, as illustrated in FIG. 11D.

In another embodiment, the structure may allow for torsion, defined as the forcing of the structure from its static form by exertion of a lateral force on one end about the longitudinal axis of the structure while an opposite lateral force is applied to the opposite end about said axis in a twisting manner, up to 30 degrees, as illustrated in FIG. 11D.

In another embodiment, the structure may allow for torsion, defined as the forcing of the structure from its static form by exertion of a lateral force on one end about the longitudinal axis of the structure while an opposite lateral force is applied to the opposite end about said axis in a twisting manner, up to 35 degrees. This concept is illustrated in FIG. 11D.

Furthermore, in accordance with some embodiments, the angle of twist may be defined by the following equation, Angle of twist=$TL/GJ_T$, where
T=Applied torque
L=length of the object the torque is being applied to or over.
G=Shear modulus or modulus of rigidity
$J_T$=torsion constant for the section.

Furthermore, in accordance with some embodiments, the angle of twist is inversely proportional to the modulus of rigidity. The modulus of rigidity in the invention described herein, is defined mainly via the textile or fabric on either side of the shielding material and via the sliding and gaps between adjacent units of shielding material. Consequently, the device's effective modulus of rigidity decreases considerably due to the reliance on the fabric or textile's material properties rather than the shielding material, thereby allowing an increased angle of twist compared to the rigid shielding material only.

Figure 11E:
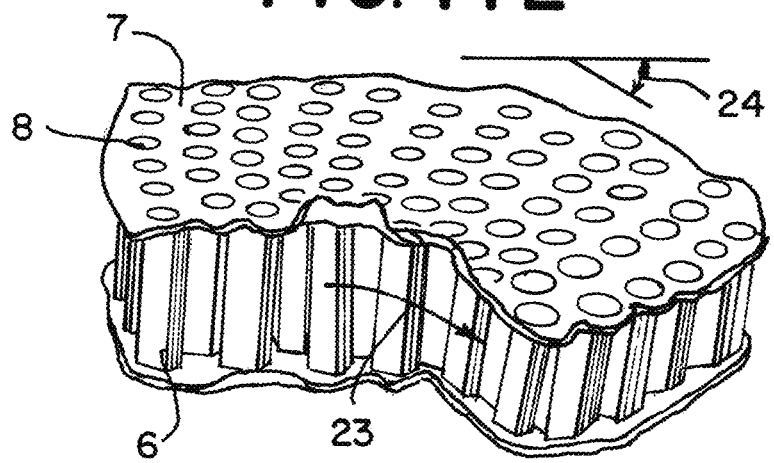
Figure 11F:
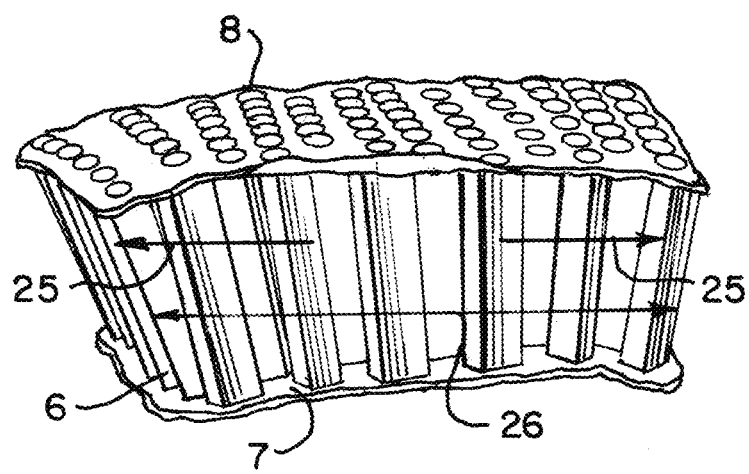

Furthermore, in accordance with some embodiments, the structure may allow for lateral bending, defined as the forcing of the structure from a static form as illustrated in FIG. 11A from a lateral view-point into an angled, curved form of up to degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 20 degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 30 degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 40 degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 50 degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 60 degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 70 degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 80 degrees. This concept is illustrated in FIG. 11E.

In another embodiment, the structure may allow for lateral bending, defined as the forcing of the structure from a static form as illustrated in FIG. 11A from a lateral view-point into an angled, curved form of up to 90 degrees. This concept is illustrated in FIG. 11E.

Figure 11G:
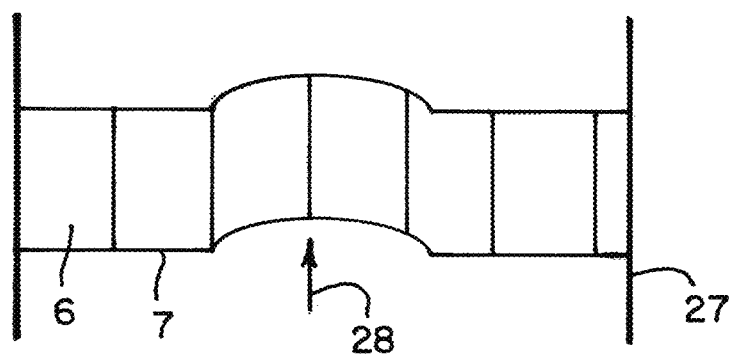

Furthermore, in accordance with some embodiments, bending angle for lateral and longitudinal bending where one side of the object is fixed as illustrated in FIG. 11C and FIG. 11E may be calculated using the equation, Angle of deflection=$(W/24EIL)*(L^4-x^4)$
W=Load
x=point along the length of the object at which the load is applied
E=Young's modulus
I=Moment of inertia
L=length of the object In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 10% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 20% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 30% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 40% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 50% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 60% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 70% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 80% of the height of the solid components due to force being applied to a central region while the ends are held fixed. This concept is illustrated in FIG. 11G.

In another embodiment, the structure may allow for localized, fixed-end bending, defined as the forcing of the structure from a static form as illustrated in FIG. 11A from a longitudinal cross-sectional view-point into a configuration with a localized area which is raised or lowered up to 90% of the height of the solid components due to force being applied to a central region while the ends are held fixed. This concept is illustrated in FIG. 11G.

Furthermore, in accordance with some embodiments, localized, fixed-end bending movement where both sides of the object are fixed as illustrated in FIG. 11G may be calculated using the equation, $y=(Wx^2/48EI)*(3L-4x)$, where
    y=bending deflection
    W=Load
    x=point along the length of the object at which the load is applied
    E=Modulus of Elasticity
    I=Moment of inertia
    L=length of the object Since the angle of bending or bending deflection is inversely proportional to the Young's modulus, the angle of bending may be higher in the configuration due to small young modulus of a textile and fabric as compared to a much higher young's modulus of a rigid shielding material. The angle of bending may also be facilitated by the ability of the adjacent solid units to slide against each other and the alignment of the adjacent units in a layer that may contain gaps.

Furthermore, in accordance with some embodiments, the structure may allow for the significant improvement of effective shear flexibility compared to solid slab of shielding material within the shielding material components resulting from forces applied from 1 to 30 degrees towards the lateral plane of the material configuration. This concept is illustrated in FIG. 11B.

In another embodiment, the structure may allow for the significant improvement of effective shear flexibility compared to solid slab of shielding material within the shielding material components resulting from forces applied from 1 to 60 degrees towards the lateral plane of the material configuration. This concept is illustrated in FIG. 11B.

In another embodiment, the structure may allow for the significant improvement of effective shear flexibility compared to solid slab of shielding material within the shielding material components resulting from forces applied from 1 to 90 degrees towards the lateral plane of material configuration. This concept is illustrated in FIG. 11B.

In another embodiment, the structure may allow for the significant improvement of effective shear flexibility compared to solid slab of shielding material within the shielding material components resulting from forces applied from 1 to 120 degrees towards the lateral plane of material configuration. This concept is illustrated in FIG. 11B.

In another embodiment, the structure may allow for the significant improvement of effective shear flexibility compared to solid slab of shielding material within the shielding material components resulting from forces applied from 1 to 150 degrees towards the lateral plane of the material configuration. This concept is illustrated in FIG. 11B.

In another embodiment, the structure may allow for the significant improvement of effective shear flexibility compared to solid slab of shielding material within the shielding material components resulting from forces applied from 1 to 179 degrees towards the lateral plane of the material configuration. This concept is illustrated in FIG. 11B.

The shear modulus or modulus of rigidity is directly proportional to the Young's modulus and hence the small young's modulus of the fabric or textile and the ability of the adjacent units of rigid shielding material to slide against one another may lead to a small shear modulus thus allowing the material to withstand greater shear stress.

Furthermore, in accordance with some embodiments, the textile or fabric may be sufficiently flexible or elastic such that it can be fashioned into a garment and be wearable and can contort together with the part of the person that is being contorted during performance of one or more anticipated tasks.

Furthermore, in accordance with some embodiments, the layer of shielding material of the configuration may be attached to a fabric or textile using heat welding as illustrated in FIGS. 5-6.

Furthermore, in accordance with some embodiments, the layer of shielding material may be attached to a fabric or textile using snap buttons consisting of ring and pins for holding the textile as illustrated in FIG. 8-9.

Furthermore, in accordance with some embodiments, the size of the rings that form part of the snap buttons may vary depending on the location of the textile between the layers or outside the layers as illustrated in FIGS. 10A-10C.

Furthermore, in accordance with some embodiments, the snap buttons may be made of material similar to that used for shielding material or of a slightly more flexible material so as to provide increased resistance to breaking and provide elasticity.

Figure 7A:
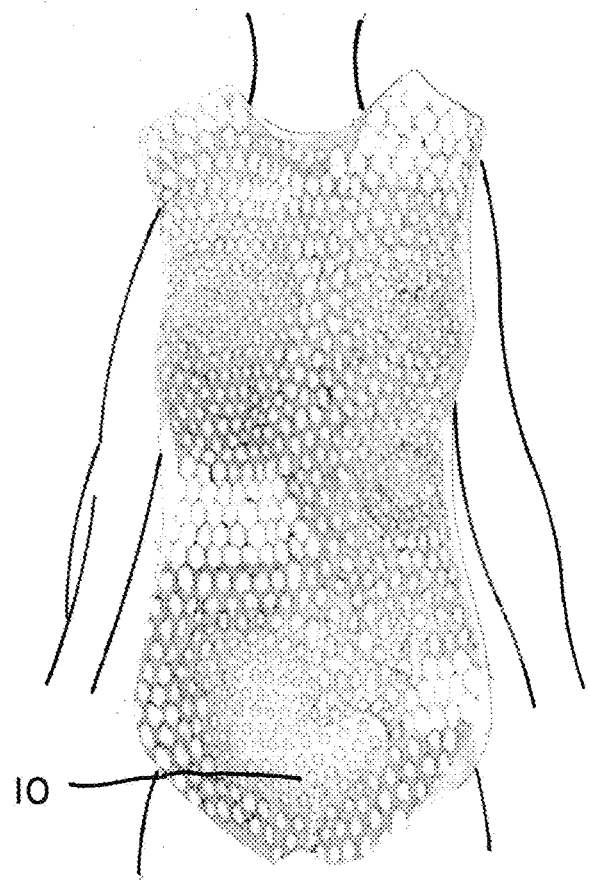
FIGS. 7A, 7B, and 7C show three levels of radiation attenuation that can be achieved using radiation protection vest labelled as 9 that contains the configuration described in FIGS. 4-6 with first level, illustrated in FIG. 7A, labelled as 10, the second level, illustrated in FIG. 7B, labelled as 11 and the third level, illustrated in FIG. 7C, labelled as 12. The three levels illustrate how the individual panels of the configuration can be assembled into a vest that contains varying thickness such as a radiation protection vest containing varying levels of radiation attenuation which are stackable.
Figure 7B:
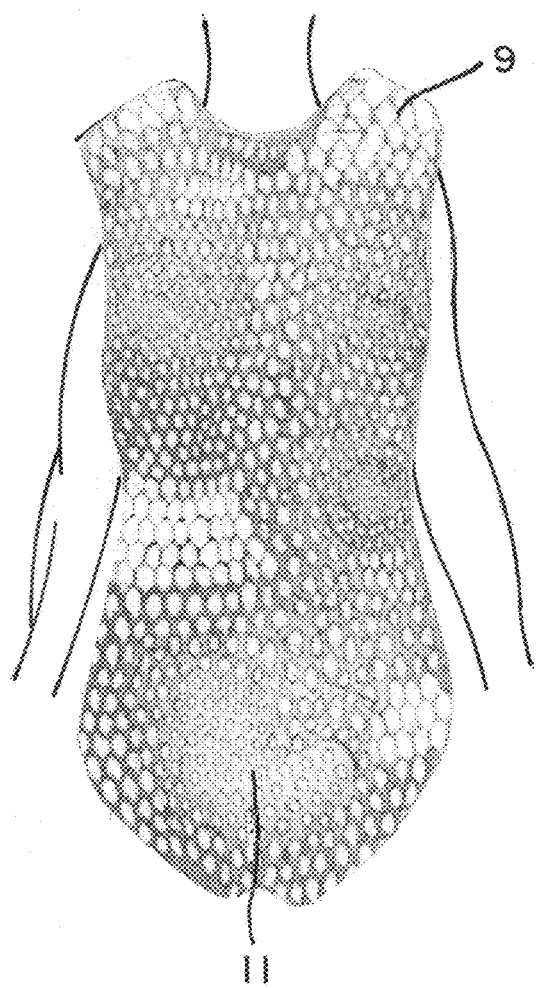
Figure 7C:
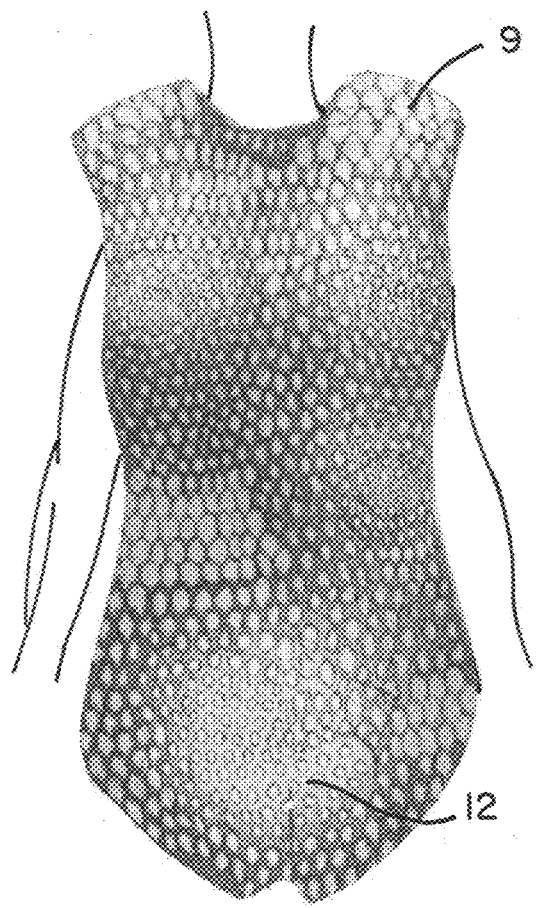

Furthermore, in accordance with some embodiments, the configuration may be incorporated into different panels that constitute a radiation shielding vest or garment as illustrated in FIGS. 7A-7C.

Furthermore, in accordance with some embodiments, the overall flexibility of the structure or the configuration when compiled into panels may allow the panels to slide on top of each thus providing flexibility and movement of the shielding garment it is configured in.

Furthermore, in accordance with some embodiments, the configuration may be incorporated in a wearable item selected from the groups of items consisting of a helmet, a bifurcated garment, a vest, a belt or a spacesuit as illustrated in FIGS. 7A-7C.

In some embodiments, the shielding material layers (first type layers) may have the ability to slide one on top of the other to allow flexibility of the configuration. The layers may be worked and finished to have a surface roughness and minimal hardness that may allow ductile material to slide. Alternatively, additional layers (second type layers) may be placed between at least some of the first type layers. The second type layers may include material configured to allow sliding of the first type layers as illustrated in FIGS. 8A and 8B.

Figure 8A:
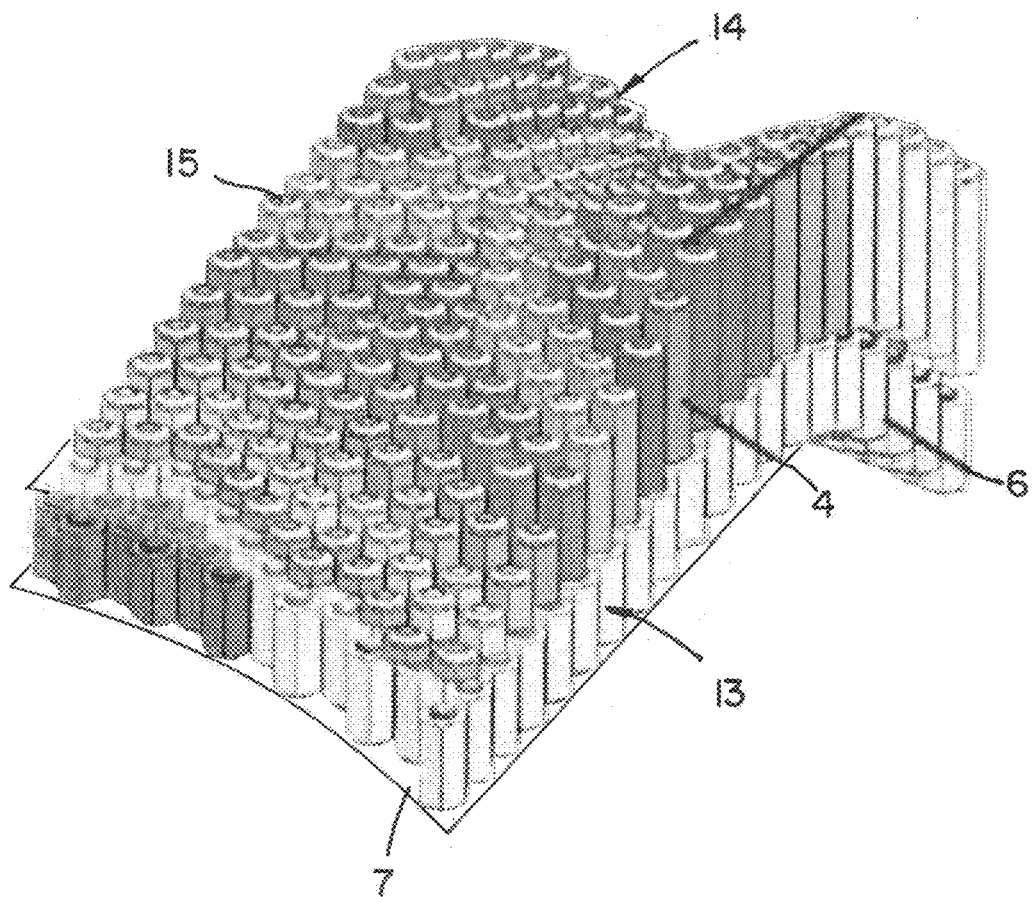
FIGS. 8A and 8B include an example of configuration with a staggered multiple layer design where the bottom layer labelled as 13 has a uniform thickness containing uniform hexagonal poles 6 and the top layer labelled as 14 provides non-uniform thickness and contains non-uniform hexagons 4 that may correspond to varying radiation attenuation levels based on surface map described in FIGS. 1-2. In both the layers, the hexagonal poles are attached to the fabric using snap joints labelled as 15. This configuration allows use of hexagonal poles that differ in their sizes to create non-uniform thickness or adjustability to a particular shape of a wearable garment. The non-uniform hexagonal poles also allow adaptation to different movements that the configuration might have to undergo.
Figure 8B:
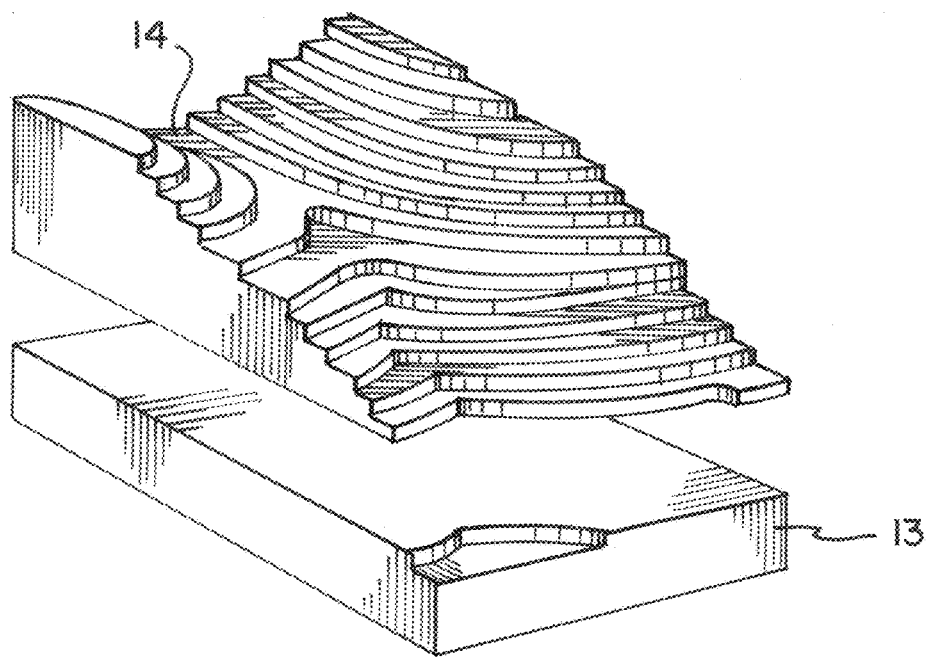

In some embodiments of the present invention, the shielding material layer when present as radiation attenuating component may be present as one layer of variable thickness, the thickness corresponding to radiation attenuation levels corresponding to underlying tissue it protects or as staggered multiple layers that can slide on top of each other and arranged to provide variable thickness corresponding to varying radiation attenuation corresponding to the underlying tissue it protects as illustrated in FIGS. 8A and 8B.

In some embodiments of the present invention, the shielding material described herein may be malleable. In some embodiments of the present invention, the shielding material of the configuration described herein may be ductile. In some embodiments of the present invention, the shielding material of the configuration described herein may be both malleable and ductile.

In some embodiments of the present invention, the shielding material of the configuration described herein may be both dense and malleable. In some embodiments of the present invention, the shielding material of the configuration described herein may be both dense and ductile. In some embodiments of the present invention, the shielding material of the configuration described herein may be dense, ductile and malleable.

In some embodiments of the present invention, the shielding material of the configuration described herein may be soft. In some embodiments of the present invention, the shielding material of the configuration described herein may be both soft and dense. In some embodiments of the present invention, the shielding material of the configuration described herein may be both soft and ductile. In some embodiments of the present invention, the shielding material of the configuration described herein may be soft, dense and ductile.

In some embodiments, the shielding material may be presented in the form of layers which are coated with a material which reduces the coefficient of friction between them. In another embodiment, the shielding material may be presented in the form of layers which are separated from each other by sheets of a material which reduces the coefficient of friction between them. In another embodiment, the shielding material may be presented in the form of layers which are separated from each other by a powder of a material which reduces the coefficient of friction between them. In another embodiment, the shielding material may be presented in the form of layers which are separated from each other by a solution of a material which reduces the coefficient of friction between them. In another embodiment, the material which reduces the coefficient of friction between the layers of shielding material may be Polytetrafluoroethylene (PTFE, Teflon), polyamide-imide (PAI), Nylon 6-6, Nylon 4-6, graphite, graphite powder, acetal homopolymer or carbon fiber.

In some embodiments, the configuration described herein may have a distribution of radiation attenuating material so as to be comprised of no less than 0.3 $g/cm^2$ polyethylene or equivalent at its minimum thickness and no less than 40 $g/cm^2$ polyethylene or equivalent at its maximum thickness when embodied in a radiation shielding vest for space radiation.

Figure 12A:
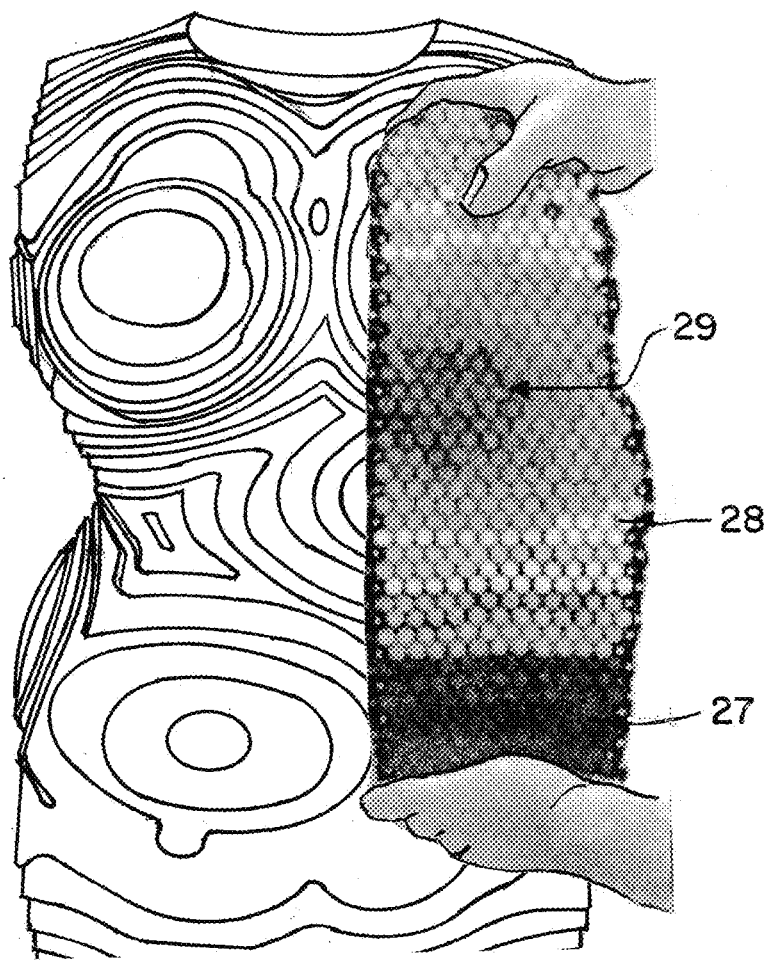
FIGS. 12A and 12B illustrate various colors of the snap buttons. The colors of the snap buttons can correspond to the thickness of the shielding material. The thickness of the shielding material can correspond to radiation attenuation levels of underlying tissue the light-weight radiation panel protects. For example, shielding material thickness 27 and its associated color identified in both FIGS. 12A and 12B would correspond with one thickness of the shielding material. Shielding material thickness 28 and its associated color identified on both FIGS. 12A and 12B would correspond with a different thickness of the shielding material. Shielding material thickness 29 and its associated color identified on both FIGS. 12A and 12B would correspond with another thickness of the shielding material.
Figure 12B:
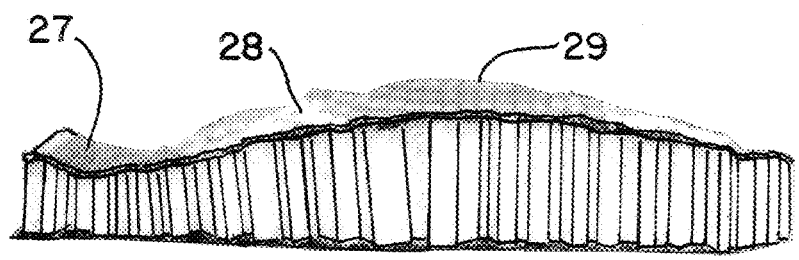

In some embodiments, the shielding material layer may be identified by different colored snap buttons labelled as 15 in FIGS. 9 and 10. The color of the snap button can correspond to the thickness and/or attenuation characteristics of the shielding material which have a relationship to the radiation attenuation levels corresponding to underlying tissue it protects as illustrated in FIGS. 12A and 12B. For example, shielding material thickness 27 and its associated color identified on both FIGS. 12A and 12B would correspond with one thickness of the shielding material. Shielding material thickness 28 and its associated color identified on both FIGS. 12A and 12B would correspond with a different thickness of the shielding material. Shielding material thickness 29 and its associated color identified on both FIGS. 12A and 12B would correspond with another thickness of the shielding material.

Thus, as an example, the scan of a user can determine the user's natural radiation attenuation characteristics at any one point, and the sensitivity of any organ underlying that point is also known. So, turning back to FIGS. 1A and 1B, this exemplary scan illustrates the tissue shielding density from a high of 19 $g/cm^2$ to a low of 7 $g/cm^2$. As the tissue's natural radiation attenuation characteristics decreases, the radiation attenuation characteristics of the shielding material needs to increase to keep a predetermined radiation attenuation profile. As a very simple example, if the user requires a uniform 20 g/cm² of shielding, a garment can be created where the shielding material only needs to provide 1 g/cm² in certain areas and 13 g/cm² where there is less tissue shielding. This corresponds to the length or thickness or material properties of the shielding material. This leads to the "topography" of the cross section illustrated in FIG. 12B. More shielding is required over the heart/lung/breast then near the shoulder or the bottom of the ribs.

In some embodiments, the configuration described herein may be accomplished by the recycling of on-board plastic materials using additive manufacturing techniques. While the configuration may be constructed on Earth and launched with astronauts for missions, it may also be manufactured in space using repurposed (recycled) material on-board using additive manufacturing capabilities which already exist on the International Space Station (ISS) and will very likely be expanded and included in future space architectures such as the planned NASA Deep Space Gateway. Recycling on-board plastic materials would allow for a greater than 90% reduction in parasitic mass of personal radiation shielding equipment for solar particle events (SPE).

The reprocessing of the materials can be a continuous process, turning "waste" into useable shielding in an ongoing process. After a number of scans, it can be determined the approximate proportion of each type of radiation attenuation characteristic of the shielding material. These elements can be kept on hand for future astronauts and just their storage can act as shielding for the ship. This allows for faster construction and readily available extra shielding in case of unplanned radiation events.

This method would entail the following steps which are illustrated in FIGS. 13 and 14:

Scanning of the astronaut pre-flight (step 1400). From the scans, then designing for the astronaut a personalized variable thickness shielding layout configuration according to the individuals' internal and external anatomy (step 1402). Reprocessing of recycled plastics materials generated on previous space flights for use in additive manufacturing machinery in space (step 1404). This reprocessing may entail melting, grinding, or other processes that allow for the recycled plastic material to be useable in the additive manufacturing machinery. Additive materials may be added to this reprocessed material to form the desired shielding material composition. Transmitting of the personalized variable thickness shielding architecture files to additive manufacturing machinery in space (step 1406). Automated manufacturing of the variable thickness shielding elements in space (step 1408). Astronaut launches from Earth with minimal mass textile framework without shielding elements (step 1410). Shielding elements already in space are inserted into the textile framework by astronaut upon arrival to the space architecture and they now enjoy radiation protection with minimal payload and parasitic mass (step 1412).

In some embodiments, the shielding material can be oriented perpendicular to the body center to get the best flexibility and protection. The configuration can be designed with a number of different panels. One example configuration can be designed with panels to overlap. For example, the overlap area 30 is illustrated in FIG. 15. The shielding materials within the overlapping portion of the panels can varying in size and/or length to maintain the desirable thickness. The overlap will occur between the panels where the panels can slide on top of each other in case a strong movement is needed as illustrated in FIG. 15. Sliding is also required for fastening the garment to the body or loosening in case of weight change. The overlapping areas are formed by gradually decreasing the hexagon's length towards the edges of the panels to keep the overlapping areas as thick as the rest of the configuration. Each panel can be placed inside a textile pocket to reduce friction between the panels. Use of layers of friction reduction material such as Teflon may be used between these pockets to allow for sliding between the layers enabling smooth movement.

The opening/closing mechanism of the material configuration for donning/doffing is along one of these panel borders with the overlapping structure. This allows for an opening/closing mechanism that does not compromise radiation protection. Hooks, buttons, or Velcro may be used along one of the overlap areas to allow opening/closing and adjustments.

The overlap structure also allows for an adjustable mechanism for tightening or loosening of the material configuration without compromising radiation protection. This adjustable mechanism may be integrated with the opening/closing mechanism.

In some embodiments, the method of scanning of an animal to design a personalized light-weight radiation protection panel further includes the steps of calculating a margin of error when determining the animal's natural radiation attenuation tolerance according to internal and external anatomy, The margin of error can include expected changes from a user's time in space, including, but not limited to body mass changes and/or reduction and the accompanying radiation attenuation tolerance changes of such changes and/or reduction; designing the personalized light-weight radiation protection panel to take into consideration the margin of error.

FIG. 17 illustrates the insertion of a light-weight radiation protection panel into a wearable garment such as a vest. The vest is made of multiple light-weight radiation protection panels. The light-weight radiation protection panels are removable. The light-weight radiation protection panels may be laid flat or stored, so as to consume minimal volume. The light-weight radiation protection panels may be stored or placed in a cargo transport bag or bags. The light-weight radiation protection panels may also be utilized to augment the protection of a space craft or storm shelter within a space craft. Multiple light-weight radiation protection panels can be combined to create wearable garments, a vest is depicted in FIG. 17.

In some embodiments, the light-weight radiation protection panel may protect any sensitive organs or animal tissue including, but not limited to, an animal's skin or brain. The light-weight radiation protection panels may be combined or partially overlap to form wearable attire including, but not limited to, a hat, helmet, hood, face-mask, or similar. In the absence of a solar particle event it may be advantageous to utilize shielding to protect one's brain from galactic cosmic rays. Thus, vest may be reconfigured into a dome shape that may be worn around one's head. This would be especially advised when rigorous movement is not required such as during sleep.

EXAMPLES

Example 1

Incorporation of the Material Configuration in a Radiation Shielding Vest Used by an Astronaut in International Space Station Allowing Mobility and Ergonomics as Per the Anticipated Tasks Device configuration: A radiation protection device made of the configuration described in the invention and as illustrated in FIG. 7 can be adapted to be worn as a vest by astronauts in International space station (ISS).

Experimental Set-up: Wearability and ergonomics of the vest is assessed to ensure that the material configuration described in this invention allows sufficient flexibility of movement as per the anticipated tasks in the ISS and does not interfere with astronaut comfort and mobility.

Results: Following the time spent in ISS, the configuration is considered to be suitable to be built into a vest as it allows flexibility, mobility, suitable ergonomics as well the ability to obtain radiation protection information.

Example 2

Determination of Shielding Requirements Using Polyethylene as Shielding Material in the Configuration Described Herein for Protection Against Space Radiation As many authors have pointed out, the most effective material per unit mass of shield is provided by hydrogen. Shields of heavier elements, lead for example, while commonly used for x- or y-ray absorption, are much less efficient per unit mass than lighter elements for absorbing energetic nuclear particles. Indeed, detailed transport calculations show clearly that these heavy target nuclei are inefficient not only because of their lower cross-sections per $g/cm^2$, but also because they serve as the sources of dose-producing secondary particles such as short-range heavy nuclear fragments and penetrating neutrons.

Hydrogen provides the most effective material per unit mass for the energetic ions encountered in SPE and GCR. Therefore, high density polyethylene is attractive as the primary shielding component due its high concentration of hydrogen atoms. Not only is it a viable material for the attenuation of radiation in the space environment, it is also potentially possible to produce this material by recycling hydrocarbon materials that have already served their original purpose (e.g. packaging materials). Higher density of the attenuation material is favorable to maximize attenuation of space radiation per unit thickness which is why high-density polyethylene would be more ideal than other forms of polyethylene.

Other materials that are hydrogen rich and could also potentially serve as dual use materials in radiation shielding for manned space flight include:

Carbon nano-materials with absorbed H

Metal hydrides: $LiH$, $MgH_2$, $LiBH_4$, $NaBH_4$, $BeH_2$, $TiH_2$ and $ZrH_2$ Pd (and alloys) with absorbed H Hydrocarbons (polyethylene or $(CH_2)n$) with or without boron High density polyethylene (HDPE), Polyethylene (PE), Cross-linked polyethylene (PEX), Linear low-density polyethylene (LLDPE), Low-density polyethylene (LDPE), Medium density polyethylene (MDPE), Ultra-high-molecular-weight polyethylene (UHMWPE), Quasi-crystals, e.g. $(TiZrNi)_1 H_{1.7}$ Condensed hydrogen (solid or liquid)

FIG. 16 illustrates the spectra of larger solar particle events and Table 1 below compares the particle energy against the thickness of certain shielding needed to attenuate the particle.

TABLE 1

Ranges of protons of varying energies through high density polyethylene vs lead.

| energy (MeV) | projected range in High Density Polyethylene (mm) | range in Pb (mm) |
|---|---|---|
| 20 | 4.10 | 0.92846 |
| 30 | 8.57 | 1.83 |
| 40 | 14.45 | 2.97 |
| 50 | 21.66 | 4.34 |
| 60 | 30.13 | 5.92 |
| 70 | 39.80 | 7.7 |
| 80 | 50.61 | 9.67 |
| 90 | 62.51 | 11.82 |
| 100 | 75.47 | 14.15 |
| 110 | 89.45 | 16.64 |
| 120 | 104.39 | 19.29 |
| 130 | 120.28 | 22.09 |
| 140 | 137.07 | 25.04 |
| 150 | 154.73 | 28.13 |
| 160 | 173.24 | 31.36 |
| 170 | 192.56 | 34.72 |
| 180 | 212.67 | 38.21 |
| 190 | 233.52 | 41.81 |
| 200 | 255.13 | 45.54 |
| 210 | 277.43 | 49.38 |
| 220 | 300.42 | 53.32 |
| 230 | 324.11 | 57.38 |
| 240 | 348.42 | 61.54 |
| 250 | 373.39 | 65.8 |
| 260 | 398.95 | 70.16 |
| 270 | 425.12 | 74.60 |
| 280 | 451.87 | 79.15 |
| 290 | 479.17 | 83.78 |
| 300 | 507.03 | 88.49 |

Example 3

Method for Determining Tissue Attenuation (AT), Desire Total Attenuation and Required Radiation Attenuation (AR) for Protecting Lungs, Ovaries and Iliac Red Bone Marrow from Space-Borne Radiation in Adult Female We employed the Visible Human Data set for this purpose. The Visible Human Project is the creation of complete, anatomically detailed, three-dimensional representations of the normal male and female human bodies. The data set includes transverse CT, MR and cryosection images of representative male and female cadavers. The male was sectioned at one-millimeter intervals, the female at one-third of a millimeter intervals. This powerful tool allowed us to study the tissues surrounding select bone marrow concentrations, and stem cell niches of the lungs and ovaries, measure their thickness and determine their overall radio density.

In an example our goal was to create a vest like shield that will protect the ovaries, lungs and red bone marrow present in the iliac bones. By studying hundreds of slices of the legs, pelvic and torso areas and complementing these studies by CT scans, we have mapped the tissue type and thickness present between the foci of protection and radiation entry points for hundreds of thousands of points along the external surface of the body around the legs, waist, and torso areas. The Fiji ImageJ software was used to process the biological images from the Visible Human Project Female. Cross sectional slices of the body at 1 mm intervals were used and designated as the z dimension. The pixel resolution in the xy plane of these images was 0.33 mm. A script was written to automate the process of generating point cloud three-dimensional coordinates for adipose tissue, bone, muscle, organs of interest (lungs, iliac red bone marrow, and ovaries). This script utilized the Versatile Wand plugin for Fiji and used pixel color threshold values. This resulted in a point cloud reconstruction of the female. This point cloud model was then filled in using known tissue/organ densities and compositions from International Commission on Radiation Protection (ICRP) Reports (ICRP, 2009. Adult Reference Computational Phantoms. ICRP Publication 110. Ann. ICRP 39 (2).) to create a useable computational phantom.

Foci of protection were then designated within the body. These foci of protection are designated three-dimensional points centered on the center of mass of stem cell niches of each organ targeted for protection by selective shielding. Using the images from the Visible Human Project and information available in biological literature, we located the areas within the lungs, iliac red bone marrow, and ovaries which had the highest concentrations of stem cells. ImageJ 3D object counter was used to calculate the center of masses of each of these stem cell niches once their 3D volumes were rendered from the original image stack provided by the Visible Human Project Dataset. For the organs with bilateral stem cell niches (lungs, iliac red bone marrow, and ovaries), two foci of protection were used; one for each side of the phantom.

Ray tracing methods were employed using this model in order to measure the thickness and radiodensity of the underlying tissue between each foci of protection point and every point on the surface of the body. This ray tracing method calculated the straight-path distances from each foci of protection to each point on the phantom's external surface while tracking the segment distances through various tissues of varying densities (adipose tissue, bone, muscle, and organs). By multiplying each distance segment by the density of the tissue the segment traversed, final values of areal density of tissue shielding in units of $g/cm^2$ were determined at each point on the surface of the phantom for each of the six foci of protection. The point cloud data was used in combination with the densities from ICRP Publication 110 to perform this calculation using Microsoft Excel but other programs such as MATLAB would also have been well suited for this purpose as well.

For each point along the external surface of the phantom there were now six different values for areal density of intrinsic body shielding corresponding to each of the six foci of protection for the lungs, iliac red bone marrow, and ovaries. The lowest areal density value for each point on the surface was used thus ensuring that each that each foci of protection receives the benefits of at least that areal density of intrinsic body shielding and not less. Not only was this a conservative approach to calculating the areal density shielding provided by the body, but it was also logical as the lowest areal density value for each point along the surface is the one corresponding to the most local foci of protection.

The points along the external surface of the phantom were then grouped into area regions on the phantom by rounding their areal densities to the nearest 1 $g/cm^2$ values. This results in the 13 different area regions on the external surface of the phantom seen in FIG. 1 corresponding to areas which provide from 19 to 7 $g/cm^2$ areal density of tissue shielding. The desired shield attenuation component for each region equals the desired total attenuation minus the tissue attenuation component for each region.

Simonsen et al. 1997 shows that beyond areal density of 20 $g/cm^2$ of PPE, the effects of additional shielding diminish for GCR spectra at solar minimum. This information combined with mass, anthropomorphic and ergonomic constraints rendering a PPE device providing areal density beyond 20 $g/cm^2$ unpractical led us to the conclusion to use 20 $g/cm^2$ for desired shielding provided by PPE for space applications.

Therefore, the most shielded region requiring additional shielding (19 $g/cm^2$ region) has a desired shielding requirement of 1 $g/cm^2$ while the least shielded region (7 $g/cm^2$) requires 13 $g/cm^2$.

Polyethylene contained within a wearable vest-like device as the primary radiation attenuating material to achieve these desired shielding requirements over the surface of the body resulted in a radiation protection device which provides highly efficient protection to the ovaries, lungs and red bone marrow present in the iliac bones from space-borne radiation.

Example 4

Method for Determining Tissue Attenuation (AT), Desire Total Attenuation and Required Radiation Attenuation (AR) for Protecting Iliac Red Bone Marrow from Space-Borne Radiation in Adult Female We employed the Visible Human Data set for this purpose. The Visible Human Project is the creation of complete, anatomically detailed, three-dimensional representations of the normal male and female human bodies. The data set includes transverse CT, MR and cryosection images of representative male and female cadavers. The male was sectioned at one-millimeter intervals, the female at one-third of a millimeter intervals. This powerful tool allowed us to study the tissues surrounding select bone marrow concentrations, measure their thickness and determine their overall radio density.

In an example our goal was to create a belt like shield that will protect the red bone marrow present in the iliac bones. By studying hundreds of slices of the legs, pelvic and torso areas and complementing these studies by CT scans, we have mapped the tissue type and thickness present between the foci of protection and radiation entry points for hundreds of thousands of points along the external surface of the body around the legs, waist, and torso areas. The Fiji ImageJ software was used to process the biological images from the Visible Human Project Female. Cross sectional slices of the body at 1 mm intervals were used and designated as the z dimension. The pixel resolution in the xy plane of these images was 0.33 mm. A script was written to automate the process of generating point cloud three-dimensional coordinates for adipose tissue, bone, muscle, and organs. This script utilized the Versatile Wand plugin for Fiji and used pixel color threshold values. This resulted in a point cloud reconstruction of the female. This point cloud model was then filled in using known tissue/organ densities and compositions from International Commission on Radiation Protection (ICRP) Reports (ICRP, 2009. Adult Reference Computational Phantoms. ICRP Publication 110. Ann. ICRP 39 (2).) to create a useable computational phantom.

Foci of protection were then designated within the body. These foci of protection are designated three-dimensional points centered on the center of mass of stem cell niches of each organ targeted for protection by selective shielding. Using the images from the Visible Human Project and information available in biological literature, we located the areas within the iliac red bone marrow which had the highest concentrations of stem cells. ImageJ 3D object counter was used to calculate the center of masses of each of these stem cell niches once their 3D volumes were rendered from the original image stack provided by the Visible Human Project Dataset. Two foci of protection were used; one for each side of the bilateral iliac bone in the phantom.

Ray tracing methods were employed using this model in order to measure the thickness and radiodensity of the underlying tissue between each foci of protection point and every point on the surface of the body. This ray tracing method calculated the straight-path distances from each foci of protection to each point on the phantom's external surface while tracking the segment distances through various tissues of varying densities (adipose tissue, bone, muscle, and organs). By multiplying each distance segment by the density of the tissue the segment traversed, final values of areal density of tissue shielding in units of $g/cm^2$ were determined at each point on the surface of the phantom for each of the two foci of protection. The point cloud data was used in combination with the densities from ICRP Publication 110 to perform this calculation using Microsoft Excel but other programs such as MATLAB would also have been well suited for this purpose as well.

For each point along the external surface of the phantom there were now two different values for areal density of intrinsic body shielding corresponding to each of the two foci of protection for the iliac red bone marrow. The lowest areal density value for each point on the surface was used thus ensuring that each that each foci of protection receives the benefits of at least that areal density of intrinsic body shielding and not less. Not only was this a conservative approach to calculating the areal density shielding provided by the body, but it was also logical as the lowest areal density value for each point along the surface is the one corresponding to the most local foci of protection on either side of the body.

The points along the external surface of the phantom were then grouped into area regions on the phantom by rounding their areal densities to the nearest 1 $g/cm^2$ values. This results in the 13 different area regions on the external surface of the phantom seen in FIG. 2 corresponding to areas which provide from 19 to 7 $g/cm^2$ areal density of tissue shielding. The desired shield attenuation component for each region equals the desired total attenuation minus the tissue attenuation component for each region.

Simonsen et al. 1997 shows that beyond areal density of 20 $g/cm^2$ PPE, the effects of additional shielding diminish for GCR spectra at solar minimum. This information combined with mass, anthropomorphic and ergonomic constraints rendering a PPE device providing areal density beyond 20 $g/cm^2$ unpractical led us to the conclusion to use 20 $g/cm^2$ for desired shielding provided by PPE for space applications.

Therefore, the most shielded region requiring additional shielding (19 $g/cm^2$ region) has a desired shielding requirement of 1 $g/cm^2$ while the least shielded region (7 $g/cm^2$) requires 13 $g/cm^2$.

Polyethylene contained within a wearable vest-like device as the primary radiation attenuating material to achieve these desired shielding requirements over the surface of the body resulted in a radiation protection device which provides highly efficient protection to the iliac red bone marrow from space-borne radiation.

Example 5

Method for Determining Tissue Attenuation (AT), Desire Total Attenuation and Required Radiation Attenuation (AR) for Protecting Lungs and Iliac Red Bone Marrow from Space-Borne Radiation in Adult Male We employed the Visible Human Data set for this purpose. The Visible Human Project is the creation of complete, anatomically detailed, three-dimensional representations of the normal male and female human bodies. The data set includes transverse CT, MR and cryosection images of representative male and female cadavers. The male was sectioned at one-millimeter intervals, the female at one-third of a millimeter intervals. This powerful tool allowed us to study the tissues surrounding select bone marrow concentrations, and stem cell niches of the lungs and ovaries, measure their thickness and determine their overall radio density.

In an example our goal was to create a vest like shield that will protect the lungs and red bone marrow present in the iliac bones. By studying hundreds of slices of the legs, pelvic and torso areas and complementing these studies by CT scans, we have mapped the tissue type and thickness present between the foci of protection and radiation entry points for hundreds of thousands of points along the external surface of the body around the legs, waist, and torso areas. The Fiji ImageJ software was used to process the biological images from the Visible Human Project Male. Cross sectional slices of the body at 1 mm intervals were used and designated as the z dimension. The pixel resolution in the xy plane of these images was 0.33 mm. A script was written to automate the process of generating point cloud three-dimensional coordinates for adipose tissue, bone, muscle, organs of interest (lungs and iliac red bone marrow). This script utilized the Versatile Wand plugin for Fiji and used pixel color threshold values. This resulted in a point cloud reconstruction of the female. This point cloud model was then filled in using known tissue/organ densities and compositions from International Commission on Radiation Protection (ICRP) Reports (ICRP, 2009. Adult Reference Computational Phantoms. ICRP Publication 110. Ann. ICRP 39 (2).) to create a useable computational phantom.

Foci of protection were then designated within the body. These foci of protection are designated three-dimensional points centered on the center of mass of stem cell niches of each organ targeted for protection by selective shielding. Using the images from the Visible Human Project and information available in biological literature, we located the areas within the lungs, iliac red bone marrow, and ovaries which had the highest concentrations of stem cells. ImageJ 3D object counter was used to calculate the center of masses of each of these stem cell niches once their 3D volumes were rendered from the original image stack provided by the Visible Human Project Dataset. For the organs with bilateral stem cell niches (lungs and iliac red bone marrow), two foci of protection were used; one for each side of the phantom.

Ray tracing methods were employed using this model in order to measure the thickness and radiodensity of the underlying tissue between each foci of protection point and every point on the surface of the body. This ray tracing method calculated the straight-path distances from each foci of protection to each point on the phantom's external surface while tracking the segment distances through various tissues of varying densities (adipose tissue, bone, muscle, and organs). By multiplying each distance segment by the density of the tissue the segment traversed, final values of areal density of tissue shielding in units of $g/cm^2$ were determined at each point on the surface of the phantom for each of the four foci of protection. The point cloud data was used in combination with the densities from ICRP Publication 110 to perform this calculation using Microsoft Excel but other programs such as MATLAB would also have been well suited for this purpose as well.

For each point along the external surface of the phantom there were now four different values for areal density of intrinsic body shielding corresponding to each of the four foci of protection for the lungs and iliac red bone marrow. The lowest areal density value for each point on the surface was used thus ensuring that each that each foci of protection receives the benefits of at least that areal density of intrinsic body shielding and not less. Not only was this a conservative approach to calculating the areal density shielding provided by the body, but it was also logical as the lowest areal density value for each point along the surface is the one corresponding to the most local foci of protection.

The points along the external surface of the phantom were then grouped into area regions on the phantom by rounding their areal densities to the nearest 1 $g/cm^2$ values. This results in the 13 different area regions on the external surface of the phantom corresponding to areas which provide from 19 to 7 $g/cm^2$ areal density of tissue shielding. The desired shield attenuation component for each region equals the desired total attenuation minus the tissue attenuation component for each region.

Simonsen et al. 1997 shows that beyond areal density of 20 $g/cm^2$ PPE, the effects of additional shielding diminish for GCR spectra at solar minimum. This information combined with mass, anthropomorphic and ergonomic constraints rendering a PPE device providing areal density beyond 20 $g/cm^2$ unpractical led us to the conclusion to use 20 $g/cm^2$ for desired shielding provided by PPE for space applications.

Therefore, the most shielded region requiring additional shielding (19 $g/cm^2$ region) has a desired shielding requirement of 1 $g/cm^2$ while the least shielded region (7 $g/cm^2$) requires 13 $g/cm^2$.

Polyethylene contained within a wearable vest-like device as the primary radiation attenuating material to achieve these desired shielding requirements over the surface of the body resulted in a radiation protection device which provides highly efficient protection to the ovaries, lungs and red bone marrow present in the iliac bones from space-borne radiation.

Example 6

Method for Determining Tissue Attenuation (AT), Desire Total Attenuation and Required Radiation Attenuation (AR) for Protecting Iliac Red Bone Marrow from Space-Borne Radiation in Adult Male We employed the Visible Human Data set for this purpose. The Visible Human Project is the creation of complete, anatomically detailed, three-dimensional representations of the normal male and female human bodies. The data set includes transverse CT, MR and cryosection images of representative male and female cadavers. The male was sectioned at one-millimeter intervals, the female at one-third of a millimeter intervals. This powerful tool allowed us to study the tissues surrounding select bone marrow concentrations, measure their thickness and determine their overall radio density.

In an example our goal was to create a belt like shield that will protect the red bone marrow present in the iliac bones. By studying hundreds of slices of the legs, pelvic and torso areas and complementing these studies by CT scans, we have mapped the tissue type and thickness present between the foci of protection and radiation entry points for hundreds of thousands of points along the external surface of the body around the legs, waist, and torso areas. The Fiji ImageJ software was used to process the biological images from the Visible Human Project Male. Cross sectional slices of the body at 1 mm intervals were used and designated as the z dimension. The pixel resolution in the xy plane of these images was 0.33 mm. A script was written to automate the process of generating point cloud three-dimensional coordinates for adipose tissue, bone, muscle, and organs. This script utilized the Versatile Wand plugin for Fiji and used pixel color threshold values. This resulted in a point cloud reconstruction of the female. This point cloud model was then filled in using known tissue/organ densities and compositions from International Commission on Radiation Protection (ICRP) Reports (ICRP, 2009. Adult Reference Computational Phantoms. ICRP Publication 110. Ann. ICRP 39 (2).) to create a useable computational phantom.

Foci of protection were then designated within the body. These foci of protection are designated three-dimensional points centered on the center of mass of stem cell niches of each organ targeted for protection by selective shielding. Using the images from the Visible Human Project and information available in biological literature, we located the areas within the iliac red bone marrow which had the highest concentrations of stem cells. ImageJ 3D object counter was used to calculate the center of masses of each of these stem cell niches once their 3D volumes were rendered from the original image stack provided by the Visible Human Project Dataset. Two foci of protection were used; one for each side of the bilateral iliac bone in the phantom.

Ray tracing methods were employed using this model in order to measure the thickness and radiodensity of the underlying tissue between each foci of protection point and every point on the surface of the body. This ray tracing method calculated the straight-path distances from each foci of protection to each point on the phantom's external surface while tracking the segment distances through various tissues of varying densities (adipose tissue, bone, muscle, and organs). By multiplying each distance segment by the density of the tissue the segment traversed, final values of areal density of tissue shielding in units of $g/cm^2$ were determined at each point on the surface of the phantom for each of the two foci of protection. The point cloud data was used in combination with the densities from ICRP Publication 110 to perform this calculation using Microsoft Excel but other programs such as MATLAB would also have been well suited for this purpose as well.

For each point along the external surface of the phantom there were now two different values for areal density of intrinsic body shielding corresponding to each of the two foci of protection for the iliac red bone marrow. The lowest areal density value for each point on the surface was used thus ensuring that each that each foci of protection receives the benefits of at least that areal density of intrinsic body shielding and not less. Not only was this a conservative approach to calculating the areal density shielding provided by the body, but it was also logical as the lowest areal density value for each point along the surface is the one corresponding to the most local foci of protection on either side of the body.

The points along the external surface of the phantom were then grouped into area regions on the phantom by rounding their areal densities to the nearest 1 $g/cm^2$ values. This results in the 13 different area regions on the external surface of the phantom corresponding to areas which provide from 19 to 7 g/cm² areal density of tissue shielding. The desired shield attenuation component for each region equals the desired total attenuation minus the tissue attenuation component for each region.

Simonsen et al. 1997 shows that beyond areal density of 20 g/cm² PPE, the effects of additional shielding diminish for GCR spectra at solar minimum. This information combined with mass, anthropomorphic and ergonomic constraints rendering a PPE device providing areal density beyond 20 g/cm² unpractical led us to the conclusion to use 20 g/cm² for desired shielding provided by PPE for space applications.

Therefore, the most shielded region requiring additional shielding (19 g/cm² region) has a desired shielding requirement of 1 g/cm² while the least shielded region (7 g/cm²) requires 13 g/cm².

Polyethylene contained within a wearable vest-like device in a solid radiation attenuating layer arrangement as the primary radiation attenuating material to achieve these desired shielding requirements over the surface of the body resulted in a radiation protection device which provides highly efficient protection to the iliac red bone marrow from space-borne radiation.

Example 7

Solid Radiation Attenuation Layer or Layers Made of Hydrocarbons as Radiation Attenuation Component of a Radiation Protection Device for Space Held by a Fabric or Textile Rigid solid pieces of polypropylene or any other hydrogen rich plastic material can be processed into desired shapes using the processing technique that is suitable for the material and the final cross-sectional profile desired. These techniques among others can include injection molding, compression molding and extrusion. In this example, polyethylene was processed into rigid solid hexagonal poles and attached to a fabric or textile using heat welding. This allows flexibility of the entire unit and sliding of the pieces against each other such that this layer can be incorporated into a wearable garment. This layer can have variable thickness using hexagons with variable height in one layer as illustrated in FIG. 4a or creating staggered layers as described in FIG. 4b and FIGS. 8A and 8B. In case of staggered layers, the hexagons in the top layer are placed as such to avoid gaps in the entire units held together by textile or fabric between the two layers and on the outside of the layers as described in FIG. 4b and FIGS. 8A and 8B. The single layer or multiple layers made of this radiation attenuation material and assembled in configuration provides variable thickness that corresponds to radiation surface map of tissue areal density shielding that is created using method described in examples 3-6 and as depicted in FIGS. 3 and 7 thereby constituting as radiation attenuation component of a radiation protection vest or device for space.

Example 8

Solid Radiation Attenuation Layer or Layers Made of Hydrocarbons as Radiation Attenuation Component of a Radiation Protection Device for Space Held by a Fabric or Textile In a different example, the solid hexagons described in Example 7 are held to the fabric or textile using snap button design as described in FIGS. 8-10. This constitutes small pins for holding the textile and rings that are smaller for the area between the layers and wider ring for the area outside the layers to hold the textile better as described in FIG. 10. This design is better suited for a staggered layer design where the bottom layer is made of hexagons with uniform height and the top layer and layers so on are made of hexagons with variable height as described in FIGS. 8A and 8B. The single layer or multiple layers made of this radiation attenuation material and assembled in this configuration provides variable thickness that corresponds to radiation surface map of tissue areal density shielding that is created using method described in examples 3-6 and as depicted in FIG. 3 and FIG. 7 thereby constituting as radiation attenuation component of a radiation protection vest or device for space.

The enhancement of flexibility in terms of bending, twisting, shear, and linear movement provided by the material configuration of sliding hexagonal pieces which are attached and encapsulated by the textile material allow for the ergonomic inclusion of the shielding material components which provides the necessary radiation attenuation which acts as an enabler of human spaceflight.

Example 9

Solid Layer or Layers Made of Rubber as Shock Absorbing Component of the Sole of a Shoe A variable thickness design is made to compliment the curvature and support needs of the human foot while static or in motion. This variable thickness design may be similar to that depicted in FIGS. 8A and 8B and is made of individual solid components consisting of repeating pattern of high density foam which is solid but compressible to absorb shock. The solid component parts may be of not only variable thicknesses, but also variable density allowing for region-specific support. The individual solid components are held together through both a connection to a harder, more durable base layer underneath which makes contact with the ground and a soft, textile layer which makes contact with the foot of the user.

The enhancement of flexibility in terms of bending, twisting, shear, and linear movement provided by the material configuration of sliding hexagonal pieces which are attached and encapsulated by the textile materials allows for the ergonomic inclusion of the shielding material components which provides ergonomic advantages by providing variable support over the surface of the foot for different regions thus enabling enhanced ergonomic advantages such as variable support during different stages of locomotion due to the sliding mechanism of the solid components which in this example act as the sole of the shoe in combination with their attached and encapsulating upper and lower layers.

Example 10

Efficacy Simulation Data

The radiation transport code HZETRN2015 was used to calculate ionizing radiation quantities such as absorbed dose and dose equivalent (shown in tables below). All simulation data was generated assuming that the crew were within a 10.7 g/cm² aluminum mass thickness shielding spacecraft. Effective dose to the crew members was calculated per NCRP Report No. 132 tissue weighting factors to calculate the dose equivalent and effective dose values. The analysis indicates an effective dose of 255 mSv for the design reference solar particle event (King '72 SPE).

Results shown in Table 2 for the Female Human model 1 indicate significant improvements in radiation protection as indicated by a decrease in effective dose for the King SPE from 255 mSv to 147 mSv. This represents more than 42% reduction in exposure and correspondingly in the risk of radiation induced cancer. Results of similar analysis for Female human model 2 shown in Table 3 indicate similarly significant (43%) reduction in exposure showing consistency in dose reduction across different individuals. It is noted that the differences in the absolute effective dose values for Female Human model 1 and Female Human model 2 are consistent with the relative size and mass of the two human models.

Analysis was also performed for the galactic cosmic rays (GCR) environment using the Female Human model 2 model along with the same generic spacecraft shielding of 10.7 g/cm^2 aluminum mass thickness, and HZETRN 2015. Analysis was performed for GCR environments at both solar maximum (1989) and solar minimum (1977). The values in Tables 4 and 5 represent total exposure for an assumed 42-day mission.

Results shown in Table 4 for solar minimum indicate reduction in effective dose from 46.3 mSv to 41.6 mSv, or more than 10%. At solar maximum, the relative benefit is smaller at approximately 9% due to the harder GCR energy spectrum (higher energy with higher penetration) as shown in Table 5. Individual reduction in organ doses are also shown in both cases.

TABLE 2

Organ dose equivalents for Female Human Model 1 with the August 1972 King SPE
Female Human Model 1

| Organ | Control Dose Eq (mSv) | Light-Weight Radiation Protection Panel Dose Eq (mSv) |
|---|---|---|
| BFO | 262.27 | 161.02 |
| Bladder | 182.91 | 129.60 |
| Bones | 435.75 | 346.83 |
| Brain | 137.62 | 134.18 |
| Breast | 698.78 | 205.05 |
| Colon | 214.85 | 121.94 |
| Esophagus | 195.67 | 129.02 |
| Muscle | 505.84 | 349.04 |
| Skin | 1083.48 | 685.64 |
| Eyes | 680.71 | 659.40 |
| Kidney | 205.93 | 111.25 |
| Liver | 167.17 | 94.23 |
| Lungs | 233.36 | 132.48 |
| Ovaries | 176.97 | 115.68 |
| Pancreas | 138.65 | 84.97 |
| Spinal Cord | 242.66 | 147.62 |
| Spleen | 285.33 | 132.47 |
| Stomach | 172.24 | 97.63 |
| Thyroid | 434.80 | 275.58 |
| Uterus | 194.83 | 119.65 |
| Intestines | 239.46 | 126.09 |
| Effective Dose(mSv) | 255.09 | 147.06 |
| Effective Dose Reduction (%) | 42% | |

TABLE 3

Organ dose equivalents using the Female human model 2 with the August 1972 King SPE effective dose reduction
Female Human Model 2

| Organ | Control Dose Eq (mSv) | Light-Weight Radiation Protection Panel Dose Eq (mSv) |
|---|---|---|
| BFO | 298.25 | 176.35 |
| Bladder | 193.81 | 124.02 |
| Bones | 380.34 | 269.29 |
| Brain | 316.98 | 307.29 |
| Breast | 807.10 | 197.37 |
| Colon | 391.28 | 195.93 |
| Esophagus | 515.28 | 403.03 |
| Muscle | 443.63 | 310.35 |
| Skin | 824.15 | 509.42 |
| Eyes | 635.44 | 616.52 |
| Kidney | 239.56 | 131.25 |
| Liver | 210.51 | 115.64 |
| Lungs | 314.87 | 169.80 |
| Ovaries | 193.34 | 117.97 |
| Pancreas | 183.82 | 109.14 |
| Spinal Cord | 272.03 | 175.56 |
| Spleen | 189.47 | 109.39 |
| Stomach | 171.78 | 101.56 |
| Thyroid | 658.04 | 425.51 |
| Uterus | 189.14 | 117.59 |
| Intestines | 260.74 | 144.73 |
| Effective Dose(mSv) | 326.26 | 183.13 |
| Effective Dose Reduction (%) | 44% | |

TABLE 4

Organ dose equivalents using the Female Human model 2 for the 1977 GCR Solar min environment (42-day mission)
Female Human Model 2

| Organ | Control Dose Eq(mSv) | Light-Weight Radiation Protection Panel Dose Eq(mSv) |
|---|---|---|
| BFO | 46.14 | 41.57 |
| Bladder | 42.69 | 39.87 |
| Bones | 48.37 | 44.66 |
| Brain | 48.91 | 48.23 |
| Breast | 54.11 | 42.52 |
| Colon | 46.95 | 43.14 |
| Esophagus | 50.80 | 47.55 |
| Muscle | 49.02 | 45.46 |
| Skin | 54.27 | 48.29 |
| Eyes | 53.56 | 52.72 |
| Kidney | 45.00 | 39.93 |
| Liver | 43.98 | 39.31 |
| Lungs | 47.44 | 41.89 |
| Ovaries | 43.87 | 40.06 |
| Pancreas | 43.24 | 38.97 |
| Spinal Cord | 46.09 | 41.85 |
| Spleen | 43.37 | 38.74 |
| Stomach | 42.84 | 38.54 |
| Thyroid | 52.53 | 46.33 |
| Uterus | 43.65 | 40.06 |
| Intestines | 45.88 | 41.17 |
| Effective Dose(mSv) | 46.34 | 41.69 |
| Effective Dose Reduction (%) | 10% | |

TABLE 5

Organ dose equivalents using the Female Human model 2
for the 1989 GCR Solar max environment (42-day mission)
Female Human Model 2

| Organ | Control Dose Eq(mSv) | Light-Weight Radiation Protection Panel Dose Eq(mSv) |
|---|---|---|
| BFO | 18.92 | 17.22 |
| Bladder | 17.65 | 16.59 |
| Bones | 19.73 | 18.37 |
| Brain | 19.98 | 19.73 |
| Breast | 21.69 | 17.56 |
| Colon | 19.17 | 17.79 |
| Esophagus | 20.58 | 19.41 |
| Muscle | 19.95 | 18.65 |
| Skin | 21.76 | 19.62 |
| Eyes | 21.57 | 21.26 |
| Kidney | 18.52 | 16.62 |
| Liver | 18.14 | 16.38 |
| Lungs | 19.41 | 17.35 |
| Ovaries | 18.12 | 16.68 |
| Pancreas | 17.87 | 16.25 |
| Spinal Cord | 18.92 | 17.34 |
| Spleen | 17.92 | 16.17 |
| Stomach | 17.73 | 16.09 |
| Thyroid | 21.16 | 18.94 |
| Uterus | 18.03 | 16.68 |
| Intestines | 18.84 | 17.08 |
| Effective Dose(mSv) | 18.98 | 17.26 |
| Effective Dose Reduction (%) | | 9% |

Different embodiments are disclosed herein. Features of certain embodiments may be combined with features of other embodiments. Thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A radiation protection device configured to be worn by a user, the radiation protection device comprising:
a wearable portion; and
radiation attenuating material configured to provide greater radiation attenuation at a first area than at a second area,
wherein, when worn by the user, the first area is proximate a radiation sensitive organ of the user and the second area is proximate an area of the user less sensitive to radiation.

2. The radiation protection device of claim 1, wherein, when worn by the user, the radiation attenuating material is thicker at the first area than at the second area.

3. The radiation protection device of claim 1, wherein the first area is proximate one or more of the user's heart, lung, and breast.

4. The radiation protection device of claim 1, wherein the radiation attenuating material forms a first panel and a second panel.

5. The radiation protection device of claim 4, wherein the first panel and the second panel overlap.

6. The radiation protection device of claim 5, wherein the radiation protection device is configured to be donned and doffed where the first panel and the second panel overlap.

7. The radiation protection device of claim 4,
wherein the wearable portion comprises a first pocket and a second pocket,
wherein the first panel is within the first pocket and the second panel is within the second pocket.

8. The radiation protection device of claim 1, wherein the wearable portion comprises a sleeveless garment.

9. A radiation protection device configured to be worn by a user, the radiation protection device comprising:
a vest comprising:
a first flap, and
a second flap configured to overlap the first flap, wherein the vest is configured to be donned and doffed where the first flap and the second flap overlap; and
radiation attenuating material configured to provide radiation attenuation and located proximate a radiation sensitive organ of the user.

10. The radiation protection device of claim 9, wherein the radiation sensitive organ comprises one or more of the user's heart, lung, and breast.

11. The radiation protection device of claim 9,
wherein the first flap comprises a first pocket, and
wherein the radiation attenuating material comprises a first panel in the first pocket.

12. The radiation protection device of claim 11,
wherein the second flap comprises a second pocket,
wherein the radiation attenuating material comprises a second panel in the second pocket,
wherein the first panel and the second panel overlap when the first flap and the second flap overlap.

* * * * *